United States Patent
Fujiwara et al.

(10) Patent No.: US 10,318,642 B2
(45) Date of Patent: Jun. 11, 2019

(54) METHOD FOR GENERATING PARAPHRASES FOR USE IN MACHINE TRANSLATION SYSTEM

(71) Applicant: Panasonic Intellectual Property Management Co., Ltd., Osaka (JP)

(72) Inventors: Nanami Fujiwara, Nara (JP); Masaki Yamauchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 16 days.

(21) Appl. No.: 15/375,267

(22) Filed: Dec. 12, 2016

(65) Prior Publication Data
US 2017/0220559 A1    Aug. 3, 2017

(30) Foreign Application Priority Data

Feb. 1, 2016 (JP) .................................. 2016-017110

(51) Int. Cl.
*G06F 17/28* (2006.01)

(52) U.S. Cl.
CPC ........ *G06F 17/289* (2013.01); *G06F 17/2827* (2013.01); *G06F 17/2854* (2013.01)

(58) Field of Classification Search
CPC .............................. G06F 17/2785; G06F 17/28
See application file for complete search history.

(56) References Cited

U.S. PATENT DOCUMENTS

| | | | | |
|---|---|---|---|---|
| 5,237,502 A * | 8/1993 | White | ................ | G06F 17/2705 704/1 |
| 7,937,396 B1 * | 5/2011 | Pasca | .................. | G06F 17/2795 707/750 |
| 8,271,453 B1 * | 9/2012 | Pasca | .................. | G06F 17/2775 704/1 |
| 2005/0102614 A1 * | 5/2005 | Brockett | ............. | G06F 17/2765 715/234 |
| 2005/0137855 A1 * | 6/2005 | Maxwell, III | ...... | G06F 17/2881 704/9 |
| 2006/0106595 A1 * | 5/2006 | Brockett | ............. | G06F 17/2785 704/9 |

(Continued)

FOREIGN PATENT DOCUMENTS

| JP | 2002-278963 | 9/2002 |
|---|---|---|
| JP | 2005-071291 | 3/2005 |

(Continued)

OTHER PUBLICATIONS

Quirk, Chris, Chris Brockett, and Bill Dolan. "Monolingual machine translation for paraphrase generation." (2004).*

(Continued)

*Primary Examiner* — Jialong He
(74) *Attorney, Agent, or Firm* — Greenblum & Bernstein, P.L.C.

(57) ABSTRACT

A paraphrase generation method according to the present disclosure generates one or more paraphrases of an original text by paraphrasing, within an acceptable limit for accepting paraphrasing, one or more of a plurality of fragments included in the original text into another expression in the language of the original text, the plurality of fragments being obtained by dividing the original text in accordance with a predetermined rule.

7 Claims, 10 Drawing Sheets

(56) References Cited

U.S. PATENT DOCUMENTS

| | | | | |
|---|---|---|---|---|
| 2006/0293876 | A1* | 12/2006 | Kamatani | G06F 17/28 704/2 |
| 2007/0016401 | A1* | 1/2007 | Ehsani | G10L 15/005 704/9 |
| 2008/0167876 | A1* | 7/2008 | Bakis | G06F 17/2785 704/260 |
| 2009/0119090 | A1* | 5/2009 | Niu | G06F 17/24 704/1 |
| 2009/0157380 | A1* | 6/2009 | Kim | G06F 17/2818 704/4 |
| 2010/0010803 | A1* | 1/2010 | Ishikawa | G06F 17/28 704/9 |
| 2010/0076746 | A1* | 3/2010 | Aikawa | G06F 17/2775 704/3 |
| 2010/0138214 | A1* | 6/2010 | Kim | G06F 17/2836 704/7 |
| 2011/0295591 | A1* | 12/2011 | Fang | G06F 17/2775 704/9 |
| 2011/0314003 | A1* | 12/2011 | Ju | G10L 15/1822 707/723 |
| 2012/0232882 | A1* | 9/2012 | Zhang | G06F 17/2827 704/2 |
| 2013/0031122 | A1* | 1/2013 | Riezler | G06F 17/30672 707/760 |
| 2013/0054224 | A1* | 2/2013 | Jiang | G06F 17/2818 704/2 |
| 2013/0103390 | A1* | 4/2013 | Fujita | G06F 17/2765 704/9 |
| 2013/0110493 | A1* | 5/2013 | Kim | G06F 17/2827 704/2 |

FOREIGN PATENT DOCUMENTS

| | | |
|---|---|---|
| JP | 2006-190072 | 7/2006 |
| JP | 2015-118498 | 6/2015 |

OTHER PUBLICATIONS

Berant, Jonathan, and Percy Liang. "Semantic parsing via paraphrasing." Proceedings of the 52nd Annual Meeting of the Association for Computational Linguistics (vol. 1: Long Papers). vol. 1. 2014.*

Bannard, Colin, and Chris Callison-Burch. "Paraphrasing with bilingual parallel corpora." Proceedings of the 43rd Annual Meeting on Association for Computational Linguistics. Association for Computational Linguistics, 2005.*

Dolan, Bill, Chris Quirk, and Chris Brockett. "Unsupervised construction of large paraphrase corpora: Exploiting massively parallel news sources." Proceedings of the 20th international conference on Computational Linguistics. Association for Computational Linguistics, 2004.*

Niitin Madnani et al., "Generating Targeted Paraphrases for Improved Translation", ACM Transactions on Intelligent Systems and Technology, vol. 4, No. 3, Article 40, Publication date : Jun. 2013.

Yuval Marton, "Distributional Phrasal Paraphrase Generation for Statistical Machine Translation", ACM Transactions on Intelligent Systems and Technology, vol. 4, No. 3, Article 39, Publication date : Jun. 2013.

* cited by examiner

FIG. 3

|  | 211 | 212 | 213 |  |
|---|---|---|---|---|
|  | FIRST FRAGMENT | SECOND FRAGMENT | PARAPHRASE ACCEPTABILITY SCORE | |
| SD11 | HIRU | OHIRU | 0.1 | SD21 |
| SD12 | SHIYOU | SHIMASUKA | 0.1 | SD22 |
| SD13 | NO | HA | 0.3 | SD23 |
| SD14 | GOHAN | NULL | 0.4 | SD24 |
| SD15 | OHIRU | HIRUMA | 0.2 | SD25 |
| SD16 | ASHITA | CHIKAI SHORAI | 0.1 | SD26 |

FIG. 11A

| No. | FIRST FRAGMENT (211) | SECOND FRAGMENT (212) | PARAPHRASE ACCEPTABILITY SCORE (213) | EXCLUDE CONDITION (214) |
|---|---|---|---|---|
| 1 | HIRU | OHIRU | 0.1 | |
| 2 | SHIYOU | SHIMASUKA | 0.1 | |
| 3 | NO | HA | 0.3 | |
| 4 | GOHAN | NULL | 0.4 | <GOHAN> NO — RP |
| 5 | OHIRU | HIRUMA | 0.2 | |

SD14 — first fragment column; SD24 — second fragment column; CTa

FIG. 11B

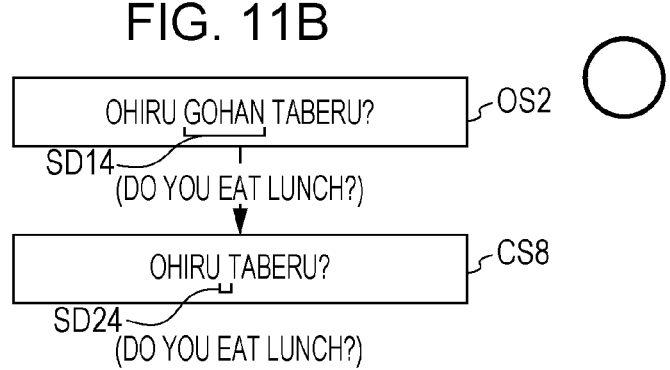

OHIRU GOHAN TABERU? — OS2
SD14
(DO YOU EAT LUNCH?)

OHIRU TABERU? — CS8
SD24
(DO YOU EAT LUNCH?)

FIG. 11C

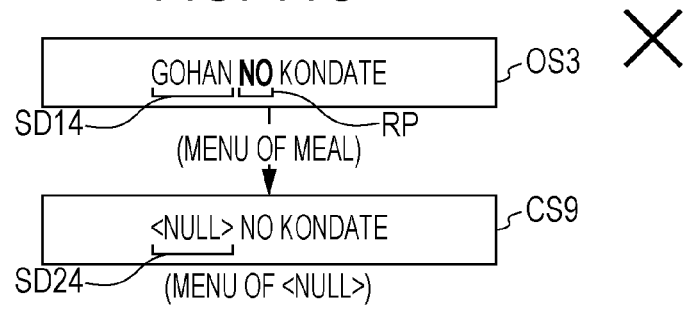

GOHAN NO KONDATE — OS3
SD14 — RP
(MENU OF MEAL)

<NULL> NO KONDATE — CS9
SD24
(MENU OF <NULL>)

FIG. 13A

| FIRST FRAGMENT (211) | SECOND FRAGMENT (212) | PARAPHRASE ACCEPTABILITY SCORE (213) |
|---|---|---|
| KEI (SD17) | KEIJIDOUSHA | 0.1 |
| KEIJIDOUSHA (SD18) | KEI | 0.1 |

CTb

| FIRST FRAGMENT (211) | SECOND FRAGMENT (212) | PARAPHRASE ACCEPTABILITY SCORE (213) |
|---|---|---|
| KEI (SD17) | KEIJIDOUSHA | 0.05 |
| KEIJIDOUSHA (SD18) | KEI | 0.5 |

CTc

SONO KEI NI NORITAI. — OS4  →  SONO KEIJIDOUSHA NI NORITAI. — CS8

SD7 → SD27

✗ — TS1
I WANT TO RIDE IN THE LIGHT

○ — TS2
I WANT TO RIDE IN THE LIGHT CAR

METHOD FOR GENERATING PARAPHRASES FOR USE IN MACHINE TRANSLATION SYSTEM

BACKGROUND

1. Technical Field

The present disclosure relates to a paraphrase generation method, a paraphrase generator, and a non-transitory recording medium having a computer program stored thereon that are used to create one or more paraphrases from a single original text, and a machine translation system that includes or implements the same.

2. Description of the Related Art

Machine translation, which involves translating a text in a first language into a text in a second language different from the first language, has been studied and developed in recent years. Various techniques have been proposed, such as those disclosed in Japanese Patent No. 3919720 and Japanese Unexamined Patent Application Publications Nos. 2002-278963, 2006-190072, and 2015-118498, as well as documents titled Generating Targeted Paraphrases for Improved Translation, NITIN MADNANI, Educational Testing Service, ACM2013, and Distributional Phrasal Paraphrase Generation for Statistical Machine Translation, YUVAL MARTON, University of Marryland, Columbia University, ACM2013.

From the viewpoint of improving the performance of machine translation, it is desirable to have as many example texts available for translation as possible. Currently, there is room for improvement in collection of such example texts.

SUMMARY

One non-limiting and exemplary embodiment provides a paraphrase generation method, a paraphrase generator, and a non-transitory recording medium having a computer program stored thereon that allow one or more paraphrases to be created from a single original text, and a machine translation system that includes or implements the same.

In one general aspect, the techniques disclosed here feature a paraphrase generation method. The paraphrase generation method includes generating one or more paraphrases of an original text by paraphrasing, within an acceptable limit for accepting paraphrasing, one or more of a plurality of fragments included in the original text into another expression in the language of the original text, the plurality of fragments being obtained by dividing the original text in accordance with a predetermined rule.

It should be noted that general or specific embodiments may be implemented as a system, an apparatus, an integrated circuit, a computer program, a storage medium, or any selective combination thereof.

The paraphrase generation method, the paraphrase generator, and the non-transitory recording medium having a computer program stored thereon according to the present disclosure, and the machine translation system that implements or includes the same allow one or more paraphrases to be created from a single source text.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 illustrates the configuration of a paraphrase table stored in a paraphrase information storage unit of the paraphrase generation unit;

FIG. 11A is an illustration for explaining a paraphrase table according to the modification stored in a paraphrase information storage unit of the paraphrase generation unit;

FIG. 11B is an illustration for explaining the paraphrase table according to the modification stored in the paraphrase information storage unit of the paraphrase generation unit;

FIG. 11C is an illustration for explaining the paraphrase table according to the modification stored in the paraphrase information storage unit of the paraphrase generation unit;

FIG. 13A is an illustration for explaining a modification of the machine translation system;

FIG. 13B is an illustration for explaining the modification of the machine translation system; and FIG. 13C is an illustration for explaining the modification of the machine translation system.

DETAILED DESCRIPTION

Figure 1:
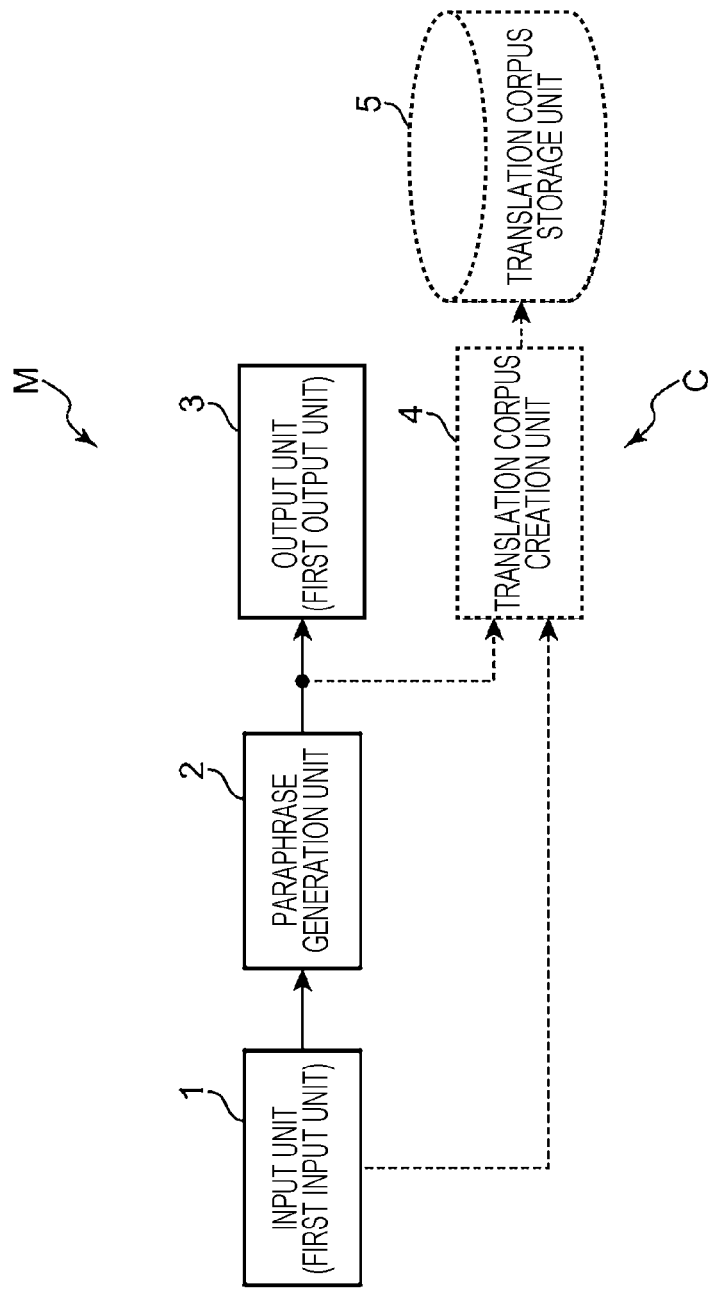
FIG. 1 is a block diagram illustrating the configuration of a paraphrase generator according to a first embodiment.

Hereinafter, an embodiment of the present disclosure will be described with reference to the drawings. Parts or components designated by like reference numerals in the drawings represent like parts or components, and description of such parts or components will not be provided as appropriate. In this specification, reference numerals without subscripts are used for generic reference, whereas reference numerals with subscripts are used to refer to a particular individual part or component.

First Embodiment: Paraphrase Generation Method, Paraphrase Generator, and Non-Transitory Recording Medium Having Computer Program Stored Thereon FIG. 1 is a block diagram illustrating the configuration of a paraphrase generator according to a first embodiment. FIG.

2 is a block diagram illustrating the configuration of a paraphrase generation unit in the paraphrase generator. FIG. 3 illustrates the configuration of a paraphrase table stored in a paraphrase information storage unit of the paraphrase generation unit.

A paraphrase generator M according to the first embodiment generates one or more texts (paraphrases) from a single text (original text) by paraphrasing a part or all of the original text in accordance with a predetermined rule. As illustrated in FIG. 1, the paraphrase generator M includes, for example, an input unit 1, a paraphrase generation unit 2, and an output unit 3.

The paraphrase generator M including the units 1 to 3 is implemented by, for example, an information processor. The information processor includes, for example, a computer including a central processing unit (CPU), a read only memory (ROM), a random access memory (RAM), and an auxiliary memory, a display that outputs data by displaying the data, and an input device used to input data. Examples of such an information processor that may be used include desktop information processors such as desktop computers, and portable information processors such as notebook computers and tablet computers.

The blocks illustrated in FIG. 1 are implemented when, for example, the CPU executes a program (paraphrase generation program) that is stored in the auxiliary memory to cause the computer to function as the paraphrase generator M. Accordingly, a paraphrase generation method is implemented in the computer. The functions of the blocks depicted in a square shape in FIG. 1 are mainly implemented in CPU, and the functions of the blocks depicted in a cylindrical shape in FIG. 1 are mainly implemented in the memory including the ROM, the RAM, the auxiliary memory, and other devices. The same applies to FIGS. 2 and 12 described later.

The input unit (first input unit) 1 is connected to the paraphrase generation unit 2. The input unit 1 is, for example, a circuit used to receive a predetermined operation, and input data into the paraphrase generator M. The input unit 1 is, for example, an input device including a plurality of input switches that are each assigned a predetermined function, such as a keyboard or a mouse. Alternatively, the input unit 1 may be, for example, an interface unit that communicates data with an external apparatus. The interface unit is, for example, an interface circuit that is compliant with the USB standard, or a communication interface circuit that is compliant with the IEEE802.11 standard. Examples of the predetermined operation include various operations necessary for the paraphrase generator M to create paraphrases from an original text, such as inputting of an original text from which to generate a paraphrase into the paraphrase generator M, and inputting of a start command that instructs the paraphrase generator M to create a paraphrase.

The output unit (first output unit) 3 is a device that is connected to the paraphrase generation unit 2, and outputs information such as a command or data input from the input unit 1, and a paraphrase generated by the paraphrase generation unit 2 in a manner described later. The output unit 3 is, for example, a display, such as a CRT display, a liquid crystal display (LCD), or an organic EL display, or a printing device such as a printer.

The input unit 1 and the output unit 3 may form a touch panel. If the input unit 1 and the output unit 3 form a touch panel as described above, the input unit 1 is, for example, a locator of a resistive membrane type, a capacitive type, or other types used to detect and input the position being operated on. The output unit 3 is a display device. With the touch panel, the locator is provided on the display surface of the display device, and one or more candidate information items that can be input are displayed on the display device. When the user touches the position where an item of information that the user desires to input is displayed, the position is detected by the locator, and the item of information being displayed at the detected position is input into the paraphrase generator M as a user's operational input. Such a touch panel allows for intuitive user input, making the resulting paraphrase generator M easy to handle for the user.

The paraphrase generation unit 2 paraphrases (substitutes) one or more of a plurality of fragments, which are obtained by dividing a text in accordance with a predetermined rule and included in an original text received by the input unit 1, with another expression in the language of the original text within an acceptable limit for accepting paraphrasing. The paraphrase generation unit 2 thus generates one or more paraphrases of the original text.

The predetermined rule may be any rule. For example, the predetermined rule may specify that a text be segmented every n letters (for example, two or three letters), in which case each of the fragments is made up of the n letters. Further, for example, the predetermined rule may specify that a text be segmented into phrases, in which case each of the fragments is made up of such a phrase. Further, for example, the predetermined rule may specify that a text be segmented into semantic classes, in which case each of the fragments is made up of a word in the semantic class. Further, for example, the predetermined rule may specify that a text be segmented into morphemes used in morphological analysis, in which case each of the fragments is made up of such a morpheme. Paraphrasing may be either applied only once to the same fragment in the original text, or applied a plurality of times to the same fragment in the original text.

The acceptable limit is set in advance as appropriate through attempts using a plurality of samples. Alternatively, the acceptable limit may be set randomly. Setting the acceptable limit to larger values allow relatively larger numbers of fragments to be paraphrased, thus allowing for generation of relatively larger numbers of paraphrases. Setting the acceptable limit to smaller values causes only relatively smaller numbers of fragments to be paraphrased, thus allowing for generation of paraphrases with relatively less semantic divergence from the original text.

Figure 2:
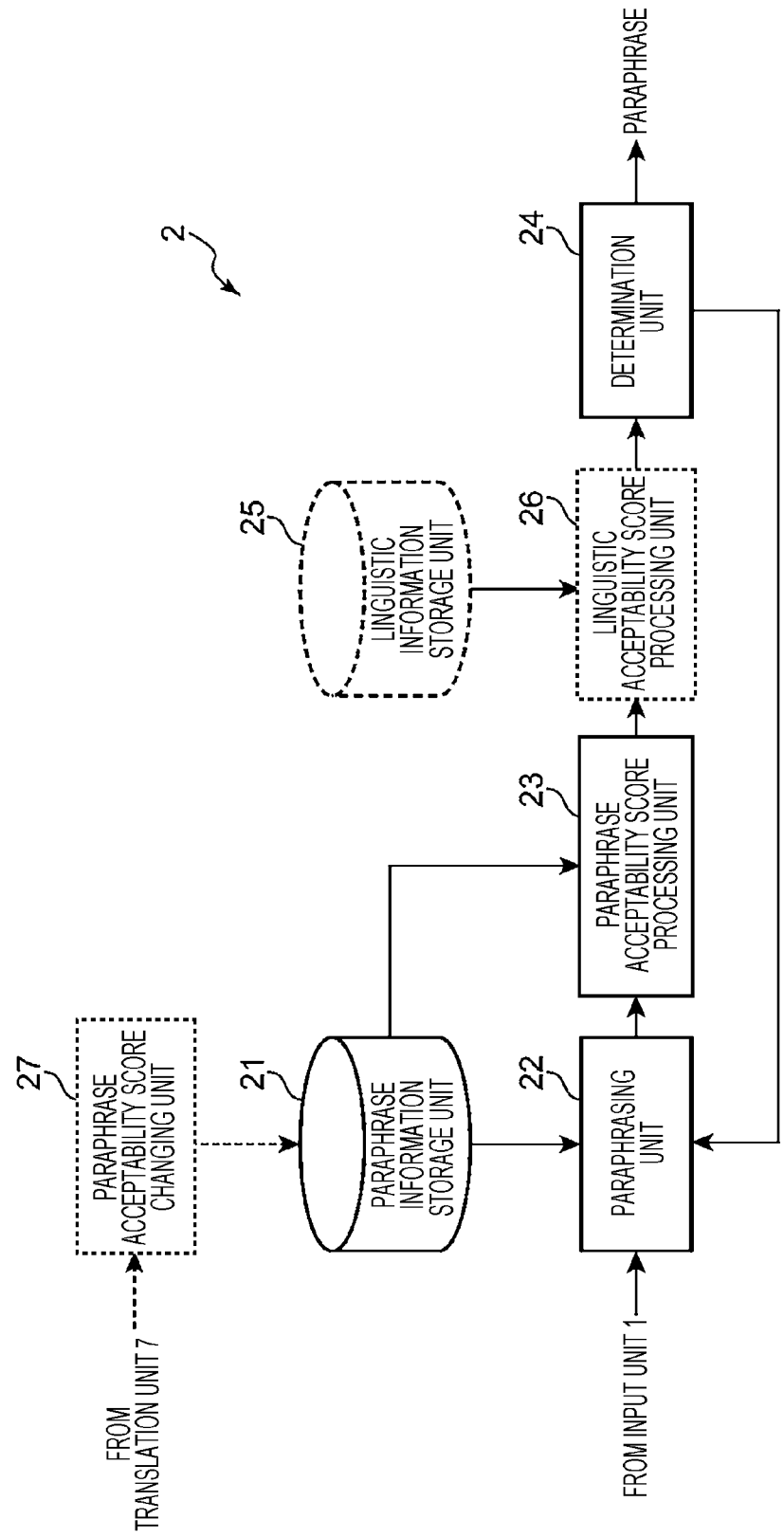
FIG. 2 is a block diagram illustrating the configuration of a paraphrase generation unit in the paraphrase generator.

More specifically, as illustrated in FIG. 2, the paraphrase generation unit 2 includes, for example, a paraphrase information storage unit 21, a paraphrasing unit 22, a paraphrase acceptability score processing unit 23, and a determination unit 24.

The paraphrase information storage unit 21 is connected to each of the paraphrasing unit 22 and the paraphrase acceptability score processing unit 23. Paraphrase information is stored in the paraphrase information storage unit 21 in advance. Paraphrase information refers to information necessary for paraphrasing a fragment into a fragment expressed in another way. In the first embodiment, paraphrase information includes, for example, a first fragment as a paraphrase source, and a second fragment as a paraphrase target, which is associated with the first fragment and represents another way of expressing the first fragment, and a paraphrase acceptability score assigned to the paraphrase pair of the first fragment and the second fragment. The first fragment and the second fragment are in the same language, and in the same language as the language of the original text. The paraphrase acceptability score is a measure of the degree to which paraphrasing from the first fragment into the second fragment is accepted. For example, the paraphrase acceptability score is set as appropriate in advance through attempts using a plurality of samples, such that smaller values indicate that a paraphrase is more acceptable. Alternatively, for example, the paraphrase acceptability score may be set randomly. Preferably, for example, relatively small values are assigned in advance for the paraphrase acceptability scores of certain types of paraphrase pairs, such as paraphrase pairs that are paraphrased with relatively high frequencies and paraphrase pairs of synonyms. Although the paraphrase acceptability score may be a fixed value, the paraphrase acceptability score may be varied through a feedback process as will be described later.

In the first embodiment, such paraphrase information is stored in the paraphrase information storage unit 21 in table format. As illustrated in FIG. 3, a paraphrase table CT in which to register this paraphrase information includes, for example, a first fragment field 211 in which to register the first fragment, a second fragment field 212 in which to register the second fragment corresponding to the first fragment registered in the first fragment field 211, and a paraphrase acceptability score field 213 in which to register a paraphrase acceptability score assigned to the paraphrase pair of the first and second fragments respectively registered in the first and second fragment fields 211 and 212. The paraphrase table CT includes a record for each such paraphrase pair.

The paraphrasing unit 22 is connected to the input unit 1. The paraphrasing unit 22 receives an input of an original text received by the input unit 1. The paraphrasing unit 22 is connected to the paraphrase acceptability score processing unit 23. The paraphrasing unit 22 paraphrases one predetermined fragment included in the original text received by the input unit 1 into another expression in the language of the original text to thereby generate one paraphrase candidate for the original text. Each one fragment to be paraphrased is determined in accordance with a predetermined rule. The predetermined selection rule is, for example, a rule such that the paraphrase acceptability scores of individual fragments included in an original text are determined from the paraphrase table, and the fragments are selected in order of decreasing paraphrase acceptability score. Employing this selection rule results in the acceptable limit being exceeded with a relatively small number of paraphrasing iterations, leading to less divergence between the original text and each resulting paraphrase. Alternatively, for example, the predetermined selection rule is a rule such that the paraphrase acceptability scores of individual fragments included in an original text are determined from the paraphrase table, and the fragments are selected in order of increasing paraphrase acceptability score. Employing this selection rule causes paraphrasing to be executed a relatively large number of times, thus allowing for generation of a relatively large number of paraphrases. Alternatively, for example, the predetermined selection rule is a rule such that individual fragments included in an original text are selected randomly. With this selection rule, the fragment to be paraphrased is selected randomly, thus allowing for generation of a wide variety of paraphrases.

More specifically, in the first embodiment, the paraphrasing unit 22 searches the first fragment field 211 of the paraphrase table CT, which is stored in the paraphrase information storage unit 21, for one fragment selected from the original text in accordance with the predetermined selection rule. As a result of this search, the paraphrasing unit 22 extracts the corresponding second fragment from the second fragment field of a record having the above-mentioned one fragment registered in the first fragment field 211, and paraphrases the fragment with the extracted second fragment to generate one paraphrase candidate for the original text. The paraphrasing unit 22 outputs the generated paraphrase candidate to the determination unit 24 via the paraphrase acceptability score processing unit 23. The paraphrasing unit 22 is connected to the determination unit 24. The paraphrasing unit 22 continues to execute the second and subsequent rounds of paraphrasing under control of the determination unit 24, until the determination unit 24 determines that the acceptable limit is exceeded as will be described later.

The paraphrase acceptability score processing unit 23 is connected to the determination unit 24. The paraphrase acceptability score processing unit 23 acquires, from the paraphrase information storage unit 21, a paraphrase acceptability score assigned to the paraphrase pair corresponding to a second fragment that is included in the paraphrase candidate input from the paraphrasing unit 22 as a result of paraphrasing. The paraphrase acceptability score processing unit 23 then calculates the cumulative total of paraphrase acceptability scores acquired for individual rounds of paraphrasing applied to a single original text to thereby determine a cumulative paraphrase acceptability score (the sum total of paraphrase acceptability scores acquired for individual rounds of paraphrasing applied to a single original text). More specifically, in the first embodiment, the paraphrase acceptability score processing unit 23 either receives, from the paraphrasing unit 22, a notification of the record from which the corresponding second fragment has been extracted, or retrieves, from the paraphrase table CT, a record having the source-side first fragment and the target-side second fragment respectively registered in the first and second fragment fields 211 and 212. The paraphrase acceptability score processing unit 23 then extracts and acquires a paraphrase acceptability score from the paraphrase acceptability score field 213 of this record. Then, the paraphrase acceptability score processing unit 23 adds the acquired paraphrase acceptability score to the cumulative paraphrase acceptability score (zero being the initial value for each single original text) calculated in the previous round of paraphrasing to calculate the cumulative paraphrase acceptability score resulting from the current round of paraphrasing (cumulative paraphrase acceptability score←cumulative paraphrase acceptability score+paraphrase acceptability score). The paraphrase acceptability score processing unit 23 outputs, to the determination unit 24, the paraphrase candidate input from the paraphrasing unit 22 and the calculated cumulative paraphrase acceptability score.

The determination unit 24 is connected to the output unit 3. The determination unit 24 determines whether paraphrasing executed in the paraphrasing unit 22 is within the acceptable limit for accepting paraphrasing. If, as a result of this determination, the determination unit 24 determines that paraphrasing executed by the paraphrasing unit 22 is within the acceptable limit, the determination unit 24 determines to retain, as a paraphrase of the original text, the paraphrase candidate generated as a result of the current round of paraphrasing executed by the paraphrasing unit 22. Then, the determination unit 24 instructs the paraphrasing unit 22 to execute the next round of paraphrasing. If, as a result of the above determination, the determination unit 24 determines that paraphrasing executed by the paraphrasing unit 22 is not within the acceptable limit, the determination unit 24 determines not to retain, as a paraphrase of the original text, the paraphrase candidate generated as a result of the current round of paraphrasing executed by the paraphrasing unit 22. Then, the determination unit 24 instructs the paraphrasing unit 22 to stop execution of the subsequent rounds of paraphrasing. Then, the determination unit 24 outputs the currently retained paraphrase to the output unit 3.

More specifically, in the above-mentioned determination process according to the first embodiment, the determination unit 24 determines whether paraphrasing executed by the paraphrasing unit 22 is within the acceptable limit, based on the paraphrase acceptability score assigned to the paraphrase pair corresponding to the second fragment used in the current round of paraphrasing. More specifically, the determination unit 24 determines whether the cumulative paraphrase acceptability score input from the paraphrase acceptability score processing unit 23 is equal to or less than a predetermined threshold (first threshold). The predetermined threshold (first threshold) corresponds to the acceptable limit. In the first embodiment, for example, the paraphrase acceptability score is set to be in the range of 0 to 1. Accordingly, the predetermined threshold (first threshold) is set to a suitable value such as 0.5, 0.7, 1, 1.2, 1.5, or 2, for example, 1. If, as a result of this determination, the determination unit 24 determines that the cumulative paraphrase acceptability score is equal to or less than 1, the determination unit 24 determines that the paraphrasing executed by the paraphrasing unit 22 is within the acceptable limit. If, as a result of the above determination, the determination unit 24 determines that the cumulative paraphrase acceptability score exceeds 1, the determination unit 24 determines that the paraphrasing executed by the paraphrasing unit 22 is not within the acceptable limit.

Figure 4:
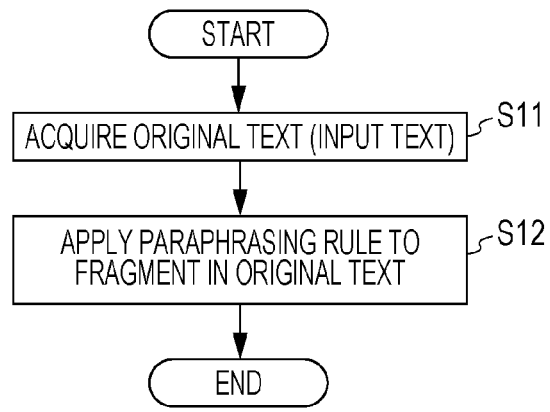
FIG. 4 is a flowchart illustrating operation of a paraphrasing unit in the paraphrase generation unit.
Figure 5:
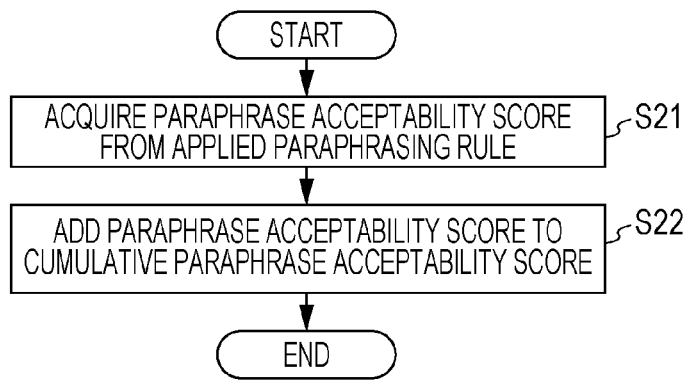
FIG. 5 is a flowchart illustrating operation of a paraphrase acceptability score processing unit in the paraphrase generation unit.
Figure 6:
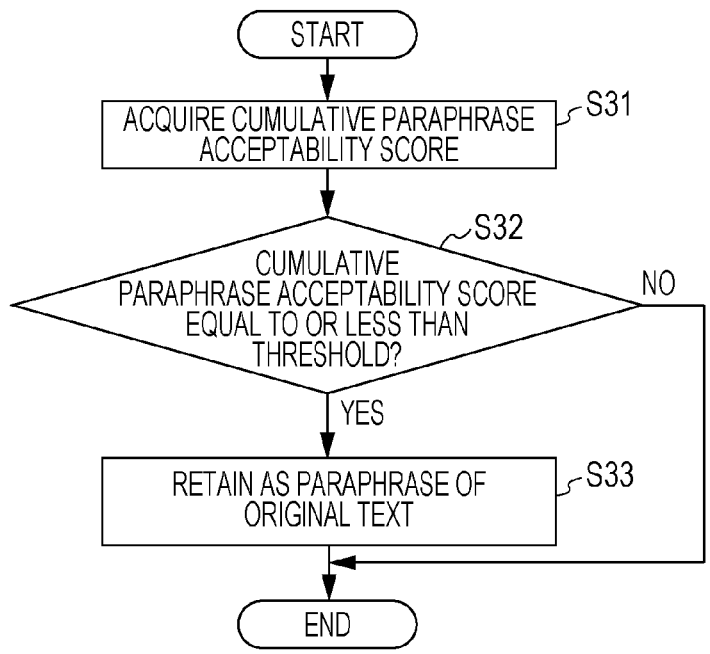
FIG. 6 is a flowchart illustrating operation of a determination unit (first within-limit determination) in the paraphrase generation unit.
Figure 7:
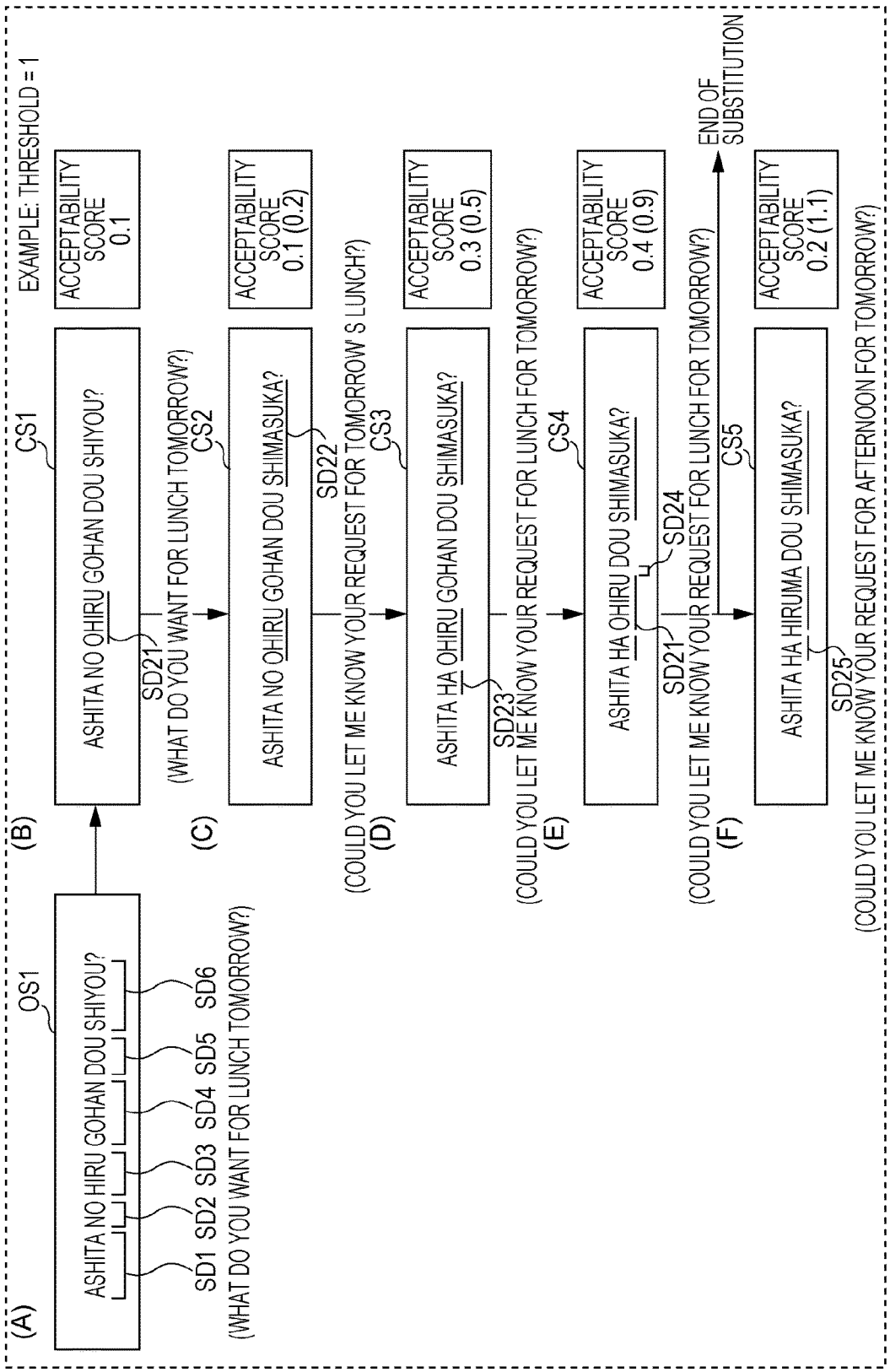
FIG. 7 is an illustration for explaining generation of paraphrases (first paraphrase-generating operation) in the paraphrase generator.

Next, operation of the paraphrase generator according to the first embodiment will be described. FIG. 4 is a flowchart illustrating operation of the paraphrasing unit in the paraphrase generation unit. FIG. 5 is a flowchart illustrating operation of the paraphrase acceptability score processing unit in the paraphrase generation unit. FIG. 6 is a flowchart illustrating operation of the determination unit (a first determination of whether paraphrasing is within an acceptable limit (to be referred to as "first within-limit determination" hereinafter)) in the paraphrase generation unit. FIG. 7 is an illustration for explaining generation of paraphrases (first paraphrase-generating operation) in the paraphrase generator. FIG. 7(A) illustrates a specific example of an original text, and FIG. 7(B) through FIG. 7(F) respectively illustrate paraphrase candidates generated by the first through fifth rounds of paraphrasing applied to the original text illustrated in FIG. 7(A).

The paraphrase generator M according to the first embodiment generates paraphrases roughly through the following procedure. First, the input unit 1 receives an original text (receiving step). Next, the paraphrase generation unit 2 generates one or more paraphrases of the original text received by the input unit 1 by paraphrasing, within an acceptable limit, one or more of a plurality of fragments included in the original text into another expression in the language of the original text (paraphrase generating step). Then, the output unit 3 outputs the one or more paraphrases received from the paraphrase generation unit 2. A more detailed description of this operation is provided below with reference to the drawings.

Receiving and Paraphrasing of Original Text

The paraphrase generator M according to the first embodiment first executes an operation of receiving an original text, and paraphrasing a fragment. Referring to FIG. 4, in the receiving and paraphrasing of an original text, the paraphrase generator M first receives, via the input unit 1, an original text (input text) to be paraphrased, thus acquiring the original text (S11).

Next, in the paraphrase generator M, the paraphrasing unit 22 of the paraphrase generation unit 2 paraphrases one predetermined fragment included in the original text received via the input unit 1 into another expression in the language of the original text to generate a paraphrase candidate for the original text. The paraphrase generator M then outputs the generated paraphrase candidate to the determination unit 24 via the paraphrase acceptability score processing unit 23 (S12), and ends the original-text receiving and paraphrasing operation. More specifically, the paraphrasing unit 22 first selects one fragment from the original text in accordance with the predetermined selection rule. Next, the paraphrasing unit 22 searches the first fragment field 211 of the paraphrase table CT, which is stored in the paraphrase information storage unit 21, for the one selected fragment. Then, as a result of this search, the paraphrasing unit 22 extracts the corresponding second fragment from the second fragment field of a record having the above-mentioned one fragment registered in the first fragment field 211. Then, the paraphrasing unit 22 paraphrases (substitutes) the one fragment in the original text with the extracted second fragment to generate one paraphrase candidate for the original text.

Through the above operation, the paraphrase generator M receives an original text via the input unit 1, and generates one paraphrase candidate corresponding to the original text received via the input unit 1.

Paraphrase Acceptability Score Processing

Next, the paraphrase generator M according to the first embodiment executes processing of paraphrase acceptability score to evaluate paraphrasing executed by the paraphrasing unit 22. Referring to FIG. 5, this paraphrase acceptability score processing is executed as follows. First, in the paraphrase generator M, the paraphrase acceptability score processing unit 23 of the paraphrase generation unit 2 acquires a paraphrase acceptability score corresponding to paraphrasing executed by the paraphrasing unit 22 (S21). More specifically, the paraphrase acceptability score processing unit 23 acquires, from the paraphrase information storage unit 21, a paraphrase acceptability score assigned to the paraphrase pair corresponding to a second fragment that is included, as a result of paraphrasing executed by the paraphrase generation unit 2, in a paraphrase candidate input from the paraphrasing unit 22. This is described in more detail below. The paraphrase acceptability score processing unit 23 either receives, from the paraphrasing unit 22, a notification of the record from which the second fragment has been extracted, or searches the paraphrase table CT for a record having the source-side first fragment and the target-side second fragment respectively registered in the first and second fragment fields 211 and 212. The paraphrase acceptability score processing unit 23 then extracts and acquires a paraphrase acceptability score from the paraphrase acceptability score field 213 of this record.

Next, in the paraphrase generator M, the paraphrase acceptability score processing unit 23 adds the acquired paraphrase acceptability score to the cumulative paraphrase acceptability score (zero being the initial value for each single original text) calculated in the previous round of paraphrasing to thereby calculate the cumulative paraphrase acceptability score resulting from the current round of paraphrasing (cumulative paraphrase acceptability score←cumulative paraphrase acceptability score+paraphrase acceptability score). Then, the paraphrase generator M outputs the paraphrase candidate input from the paraphrasing unit 22 and the calculated cumulative paraphrase acceptability score to the determination unit 24 (S22), and ends the processing of paraphrase acceptability score.

Through the above operation, in order to evaluate paraphrasing executed by the paraphrasing unit 22, the paraphrase generator M acquires the paraphrase acceptability score for the executed paraphrasing to calculate a cumulative paraphrase acceptability score.

Determination of Whether Paraphrasing is within Acceptable Limit

Next, the paraphrase generator M according to the first embodiment executes a determination of whether paraphrasing executed by the paraphrasing unit 22 is within an acceptable limit. Referring to FIG. 6, the determination of whether paraphrasing is within an acceptable limit is executed as follows. First, in the paraphrase generator M, the determination unit 24 of the paraphrase generation unit 2 acquires a cumulative paraphrase acceptability score from the paraphrase acceptability score processing unit 23 (S31).

Next, in the paraphrase generator M, the determination unit 24 of the paraphrase generation unit 2 determines whether paraphrasing executed by the paraphrasing unit 22 is within an acceptable limit (S32). More specifically, the determination unit 24 determines whether the cumulative paraphrase acceptability score acquired from the paraphrase acceptability score processing unit 23 is equal to or less than the predetermined threshold (first threshold). If it is determined as a result of this determination that the cumulative paraphrase acceptability score is equal to or less than the predetermined threshold, the determination unit 24 determines that the paraphrasing executed by the paraphrasing unit 22 is within the acceptable limit (Yes). Thus, the paraphrase candidate generated by the current round of paraphrasing executed by the paraphrasing unit 22 is stored into the RAM or other memories (not illustrated) as a paraphrase, and the paraphrasing unit 22 is instructed to execute the next round of paraphrasing for a single original text (S33). This ends the determination of whether paraphrasing is within an acceptable limit. If it is determined as a result of the above determination that the cumulative paraphrase acceptability score exceeds the predetermined threshold, the determination unit 24 determines that the paraphrasing executed by the paraphrasing unit 22 is not within the acceptable limit (No). Thus, the paraphrase candidate generated by the current round of paraphrasing executed by the paraphrasing unit 22 is not retained as a paraphrase, and the paraphrasing unit 22 is instructed to stop the subsequent executions of paraphrasing for a single original text. This ends the determination of whether paraphrasing is within an acceptable limit.

Through the above operation, the paraphrasing unit 22 executes a determination of whether paraphrasing is within an acceptable limit in order to evaluate paraphrasing executed by the paraphrasing unit 22.

When execution of paraphrasing by the paraphrasing unit 22 is stopped, the paraphrase generator M outputs the retained paraphrase from the output unit 3.

One specific example of the above operation will be described with reference to FIG. 7. In this specific example, the paraphrase table CT illustrated in FIG. 3 is applied to an original text (input text) OS1 illustrated in FIG. 7(A), and individual fragments are selected in the order of the corresponding records in the paraphrase table CT illustrated in FIG. 3. The predetermined threshold (first threshold) is set to 1.

First, at step S11, the original text OS1 illustrated in FIG. 7(A) is input from the input unit 1. As illustrated in FIG. 7(A), the original text OS1 is made up of fix fragments SD1 to SD6. Next, at step S12, the fragment SD3 is selected, and a record having the fragment SD3 registered in the first fragment field 211 is retrieved. A second fragment SD21 registered in the second fragment field 212 of the retrieved record is extracted, and the fragment SD3 is paraphrased (substituted) with the second fragment SD21. As a result, one paraphrase candidate CS1 for the original text OS1 is generated as illustrated in FIG. 7(B).

Then, at step S21, a paraphrase acceptability score "0.1" is acquired from the paraphrase acceptability score field 213 of the retrieved record. At step S22, the cumulative paraphrase acceptability score resulting from the current round of paraphrasing is calculated from the acquired paraphrase acceptability score "0.1". In the initial (first) round of paraphrasing, the cumulative paraphrase acceptability score is initialized to 0. Thus, the cumulative paraphrase acceptability score obtained at step S22 as a result of the first round of paraphrasing is equal to the paraphrase acceptability score "0.1" acquired at step S22 (cumulative paraphrase acceptability score←0+paraphrase acceptability score). The value "0.1" is illustrated in FIG. 7(B). In FIG. 7(C) through FIG. 7(F), a cumulative paraphrase acceptability score x is indicated as a value (x) in parentheses.

Next, at step S31, the cumulative paraphrase acceptability score "0.1" calculated at step S22 is acquired. At step S32, it is determined whether the acquired cumulative paraphrase acceptability score "0.1" is equal to or less than the predetermined threshold of 1. In the initial round of paraphrasing, the cumulative paraphrase acceptability score "0.1" is equal to or less than the predetermined threshold of 1 as illustrated in FIG. 7(B). Thus, step S33 is executed. At step S33, the paraphrase candidate CS1 illustrated in FIG. 7(B) is retained as a paraphrase, and the paraphrasing unit 22 is instructed to execute the next (second) round of paraphrasing.

Thus, the second round of paraphrasing is executed in the same manner as described above. As a result, the fragment SD6 in the original text OS1 is paraphrased with a second fragment SD22, a paraphrase candidate CS2 is generated, and a paraphrase acceptability score "0.1" and a cumulative paraphrase acceptability score "0.2" (=0.1+0.1) are obtained. The results are illustrated in FIG. 7(C). As illustrated in FIG. 7(C), the cumulative paraphrase acceptability score "0.2" is equal to or less than the predetermined threshold of 1. Thus, step S33 is executed. At step S33, the paraphrase candidate CS2 illustrated in FIG. 7(C) is retained as a paraphrase, and the paraphrasing unit 22 is instructed to execute the next (third) round of paraphrasing.

Thus, the third round of paraphrasing is executed in the same manner as described above. As a result, the fragment SD2 in the original text OS1 is paraphrased with a second fragment SD23, a paraphrase candidate CS3 is generated, and a paraphrase acceptability score "0.3" and a cumulative paraphrase acceptability score "0.5" (=0.2+0.3) are obtained. The results are illustrated in FIG. 7(D). As illustrated in FIG. 7(D), the cumulative paraphrase acceptability score "0.5" is equal to or less than the predetermined threshold of 1. Thus, step S33 is executed. At step S33, the paraphrase candidate CS3 illustrated in FIG. 7(D) is retained as a paraphrase, and the paraphrasing unit 22 is instructed to execute the next (fourth) round of paraphrasing.

Thus, the fourth round of paraphrasing is executed in the same manner as described above. As a result, the fragment SD4 in the original text OS1 is paraphrased with a second fragment SD24, a paraphrase candidate CS4 is generated, and a paraphrase acceptability score "0.4" and a cumulative paraphrase acceptability score "0.9" (=0.5+0.4) are calculated. The results are illustrated in FIG. 7(E). As illustrated in FIG. 7(E), the cumulative paraphrase acceptability score "0.9" is equal to or less than the predetermined threshold of 1. Thus, step S33 is executed. At step S33, the paraphrase candidate CS4 illustrated in FIG. 7(E) is retained as a paraphrase, and the paraphrasing unit 22 is instructed to execute the next (fifth) round of paraphrasing.

Thus, the fifth round of paraphrasing is executed in the same manner as described above. As a result, the fragment SD3 in the original text OS1 (the second fragment SD21 in the paraphrase candidate CS4 that corresponds to the fragment SD3) is paraphrased with a second fragment SD25, a paraphrase candidate CS5 is generated, and a paraphrase acceptability score "0.2" and a cumulative paraphrase acceptability score "1.1" (=0.9+0.2) are obtained. The results are illustrated in FIG. 7(F). As illustrated in FIG. 7(F), the cumulative paraphrase acceptability score "1.1" is not equal to or less than the predetermined threshold of 1 (exceeds the predetermined threshold of 1). Thus, step S33 is not executed. That is, the paraphrase candidate CS5 illustrated in FIG. 7(F) is not retained as a paraphrase, and the paraphrasing unit 22 is instructed to stop the next (sixth) round of paraphrasing.

The differences in expression among the original text OS1, the paraphrase candidate CS1, and the paraphrase candidate CS2 in Japanese are similar to the differences in expression among the following corresponding texts in English.

"What do you want for lunch tomorrow?"
"What do you want for tomorrow's lunch?"
"Could you let me know your request for tomorrow's lunch?"

Through the above operation, four paraphrase candidates CS1 to CS4 are generated as paraphrases of a single original text OS1, and output from the output unit 3.

As described above, the paraphrase generator M according to the first embodiment, the paraphrase generation method and the non-transitory recording medium having a computer program stored thereon that are respectively implemented and included in the paraphrase generator M allow one or more paraphrases of an original text to be generated by paraphrasing, within an acceptable limit, one or more of a plurality of fragments included in the original text into another expression in the language of the original text. Therefore, the paraphrase generator M, the paraphrase generation method, and the non-transitory recording medium having a computer program stored thereon allow one or more paraphrases to be created as example texts from a single original text. In particular, as will be described later, when used for creating a translation corpus with a collection of a plurality of text pairs each including a first text in a first language paired with a second text in a second language different from the first language, the paraphrase generator M, the paraphrase generation method, and the non-transitory recording medium having a computer program stored thereon allow the number of example texts (text pairs) in the translation corpus to be increased automatically.

Japanese Unexamined Patent Application Publication No. 2006-190072 mentioned above proposes an automatic paraphrasing apparatus, an automatic paraphrasing method, and a paraphrase processing program that are used to, for example, perform pre-processing in a machine translator to transform (paraphrase) an input original expression into another semantically equivalent expression suitable for subsequent processing. More specifically, the automatic paraphrasing apparatus disclosed in Japanese Unexamined Patent Application Publication No. 2006-190072 includes the following components: an expression fragment memory that stores expression fragments that appear in a first set of example texts in a predetermined language, together with the frequency of each individual expression fragment in the first set of example texts; a paraphrase memory that stores one or more paraphrases for each of example texts contained in a second set of example texts in the predetermined language, together with paraphrase information indicative of the manner in which paraphrasing is applied to obtain the paraphrases; a paraphrase information memory that stores a plurality of pieces of paraphrase information indicative of the manner in which individual example texts in the second set of example texts are paraphrased into paraphrases, together with the frequency with which each individual piece of paraphrase information is applied; a retrieval unit that receives an original text to be paraphrased, and retrieves, from among paraphrases stored in the paraphrase memory, paraphrases that share, with the original text, at least one of the expression fragments stored in the expression fragment memory; an evaluation unit that evaluates a validity score of each individual paraphrase retrieved by the retrieval unit, with regard to paraphrasing between the retrieved paraphrase and the corresponding source example text and paraphrasing between the retrieved paraphrase and the original text, the validity score being calculated by a calculation method determined in advance based on the frequency of application of paraphrase information stored in the paraphrase information memory; and an original text paraphrasing unit that generates a paraphrase of the original text by back-applying, to the original text, paraphrasing information associated with a paraphrase whose validity score as evaluated by the evaluating unit satisfies a predetermined condition.

As described above, the automatic paraphrasing apparatus disclosed in Japanese Unexamined Patent Application Publication No. 2006-190072 generates a paraphrase by paraphrasing an original expression input into a machine translator into an expression that is easy for the machine translator to translate. As such, the automatic paraphrasing apparatus disclosed in Japanese Unexamined Patent Application Publication No. 2006-190072 generates only a single paraphrase for a single input text, and does not generate a plurality of paraphrases for a single input text. Further, the automatic paraphrasing apparatus disclosed in Japanese Unexamined Patent Application Publication No. 2006-190072 does not add a generated paraphrase to a translation corpus, nor does the automatic paraphrasing apparatus generate a translation corpus. Therefore, Japanese Unexamined Patent Application Publication No. 2006-190072 neither discloses nor suggests the first embodiment mentioned above.

Further, Japanese Unexamined Patent Application Publication No. 2015-118498 mentioned above proposes a technique for creating similar texts for voice interactive systems. More specifically, the technique disclosed in Japanese Unexamined Patent Application Publication No. 2015-118498, which creates similar texts with the same intent, causes a computer to function as the following units: a seed text analysis unit that detects seed words related to each other in seed texts, the seed texts representing given texts with the same intent; a synonym search unit that searches a synonym database for one or more synonyms similar to each seed word; a seed word co-occurrence vector calculating unit that refers to a set of texts with the same intent to calculate a seed word co-occurrence vector with individual context words as vector elements, the seed word co-occurrence vector representing the frequency of each individual context word relevant to each seed word; a synonym co-occurrence vector calculating unit that refers to a large set of general texts to calculate a synonym co-occurrence vector with individual context words as vector elements, the synonym co-occurrence vector representing the frequency of each individual context word relevant to each synonym; a synonym selecting unit that selects a synonym with a synonym co-occurrence vector having a similarity equal to or greater than a predetermined threshold relative to the seed word co-occurrence vector for each seed word; and a similar text creating unit that creates similar texts in which each seed word and the synonyms co-occur.

As described above, Japanese Unexamined Patent Application Publication No. 2015-118498 relates to voice interactive systems, and is not intended for application to machine translation. Thus, the technique disclosed in Japanese Unexamined Patent Application Publication No. 2015-118498 does not create a translation corpus. Japanese Unexamined Patent Application Publication No. 2015-118498 is directed to creation of similar texts with the same intent, and thus a similar text created in this way is not necessarily the same in meaning as the corresponding source text. Further, in Japanese Unexamined Patent Application Publication No. 2015-118498 mentioned above, a synonym co-occurrence vector with a similarity equal to or greater than a predetermined threshold relative to the seed word co-occurrence vector for each seed word is used to select a synonym. In this regard, the similarity mentioned above is a measure of similarity between the seed word co-occurrence vector and the synonym co-occurrence vector. As such, this similarity measure is not equivalent to the acceptable limit for accepting paraphrasing, the paraphrase acceptability score, the cumulative paraphrase acceptability score, or other such measures according to the first embodiment mentioned above. Therefore, Japanese Unexamined Patent Application Publication No. 2015-118498 neither discloses nor suggests the first embodiment mentioned above.

In the first embodiment, a paraphrase acceptability score is assigned to each paraphrase pair of first and second fragments. Therefore, the paraphrase generator M, the paraphrase generation method, and the non-transitory recording medium having a computer program stored thereon described above enable quantitative comparison and assessment of paraphrase acceptability score and acceptable limit. Further, suppose that the paraphrase acceptability score is set to smaller values for more acceptable paraphrases. In this case, for example, when relatively small values are assigned in advance for the acceptability scores of certain types of paraphrase pairs, such as paraphrase pairs generally paraphrased with relatively high frequencies and paraphrase pairs of synonyms, this allows the paraphrase generator M, the paraphrase generation method, and the non-transitory recording medium having a computer program stored thereon to generate paraphrases that are substantially identical in meaning to the original text through quantitative comparison and assessment of paraphrase acceptability score and acceptable limit.

In the first embodiment, the paraphrase generation unit 2 determines whether paraphrasing executed by the paraphrasing unit 22 is within the acceptable limit based on paraphrase acceptability score. Alternatively, the paraphrase generation unit 2 may further determine whether paraphrasing executed by the paraphrasing unit 22 is within the acceptable limit based on linguistic acceptability score. That is, the determination of whether paraphrasing executed by the paraphrasing unit 22 is within the acceptable limit may be made based on paraphrase acceptability score and linguistic acceptability score.

The paraphrase generation unit 2 according to this modification further includes a linguistic information storage unit 25 and a linguistic acceptability score processing unit 26 as indicated by broken lines in FIG. 2. That is, the paraphrase generation unit 2 according to the modification includes the paraphrase information storage unit 21, the paraphrasing unit 22, the paraphrase acceptability score processing unit 23, the determination unit 24, the linguistic information storage unit 25, and the linguistic acceptability score processing unit 26. The paraphrase information storage unit 21, the paraphrasing unit 22, and the paraphrase acceptability score processing unit 23 according to this modification are configured in the same manner as mentioned above except in that the paraphrase acceptability score processing unit 23 is connected to the determination unit 24 via the linguistic acceptability score processing unit 26. Thus, a description of these components is not repeated.

The linguistic information storage unit 25 is connected to the linguistic acceptability score processing unit 26, and stores linguistic information. Linguistic information refers to information necessary for calculating a linguistic acceptability score. Linguistic information represents, for example, a language model, a semantic vector, or other such information built from a relatively large-scale data set. The first embodiment uses the language model as linguistic information. The linguistic acceptability score is a measure of the degree to which a paraphrase candidate generated by the paraphrasing unit 22 is accepted as having a linguistically correct meaning.

The linguistic acceptability score processing unit 26 is provided between the paraphrase acceptability score processing unit 23 and the determination unit 24, and connected to each of the paraphrase acceptability score processing unit 23 and the determination unit 24. The linguistic acceptability score processing unit 26 calculates, based on linguistic information stored in the linguistic information storage unit 25, the linguistic acceptability score of a paraphrase candidate generated by the paraphrasing unit 22 that is obtained via the paraphrase acceptability score processing unit 23. In the first embodiment, the linguistic acceptability score processing unit 26 determines, as the linguistic acceptability score of the paraphrase candidate, a language model, for example, an N-gram language model of the paraphrase candidate based on a language model stored in the linguistic information storage unit 25. The N-gram language model of a paraphrase candidate, which is a model of N-gram of N words including a fragment paraphrased by the paraphrasing unit 22, is determined by, for example, the (N−1) words preceding the fragment paraphrased by the paraphrasing unit 22 (N is an integer equal to or greater than 2). The linguistic acceptability score processing unit 26 may calculate, as the linguistic acceptability score of the paraphrase candidate, the semantic vector of the paraphrase candidate based on a semantic vector stored in the linguistic information storage unit 25. The linguistic acceptability score processing unit 26 outputs the calculated linguistic acceptability score to the determination unit 24.

As described above, the determination unit 24 is connected to the output unit 3, and determines whether paraphrasing executed by the paraphrasing unit 22 is within the acceptable limit for accepting paraphrasing. According to this modification, in the determination process executed by the determination unit 24, the determination of whether paraphrasing executed by the paraphrasing unit 22 is within the acceptable limit is made by using, in addition to a paraphrase acceptability score, a linguistic acceptability score indicating the degree to which a paraphrase candidate generated by the paraphrasing unit 22 is accepted as having a linguistically correct meaning. More specifically, in addition to a determination based on paraphrase acceptability score, the determination unit 24 further makes a determination of whether a linguistic acceptability score input from the linguistic acceptability score processing unit 26 is equal to or less than a predetermined threshold (second threshold). The predetermined threshold (second threshold) corresponds to the acceptable limit. For example, in the first embodiment, the predetermined threshold equates to the probability of a language model, and is thus set to suitable values such as 0.4, 0.5, and 0.6, for example, 0.5. If, as a result of this determination, the determination unit 24 determines that the linguistic acceptability score is equal to or less than 0.5, the determination unit 24 determines that the paraphrasing executed by the paraphrasing unit 22 is not within the acceptable limit. If, as a result of this determination, the determination unit 24 determines that the linguistic acceptability score exceeds 0.5, the determination unit 24 determines that the paraphrasing executed by the paraphrasing unit 22 is within the acceptable limit.

Figure 8:
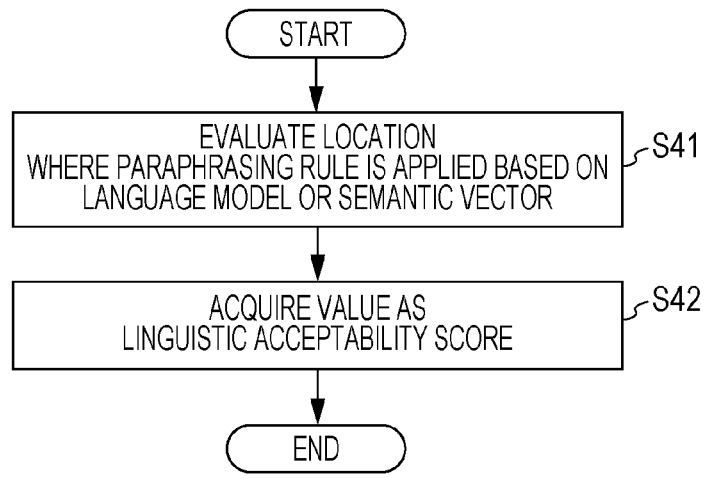
FIG. 8 is a flowchart illustrating operation of a linguistic acceptability score processing unit in a paraphrase generation unit according to a modification.
Figure 9:
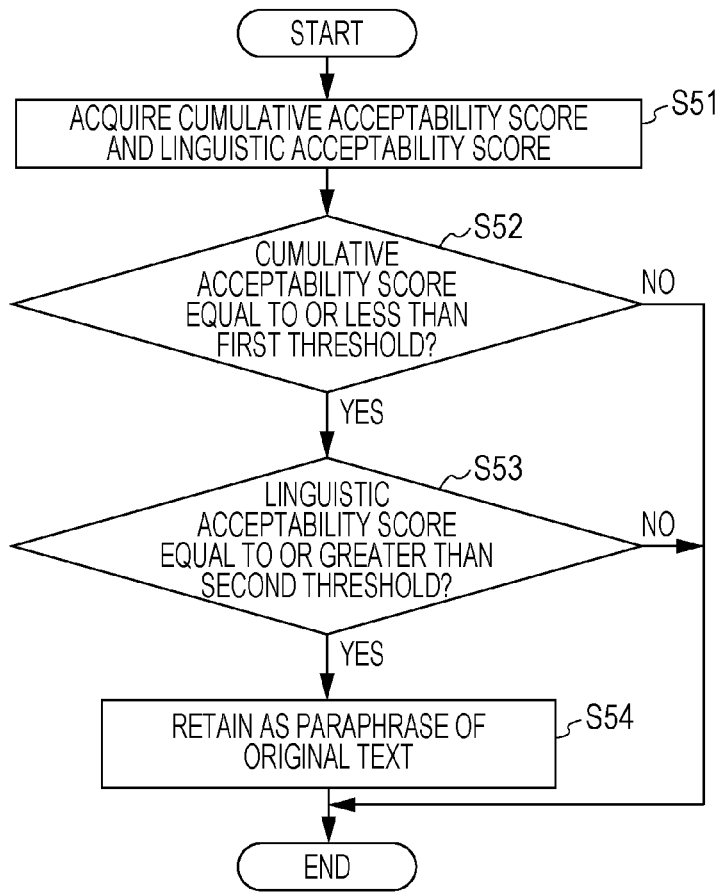
FIG. 9 is a flowchart illustrating operation of the determination unit (second within-limit determination) in the paraphrase generation unit according to a modification.
Figure 10:
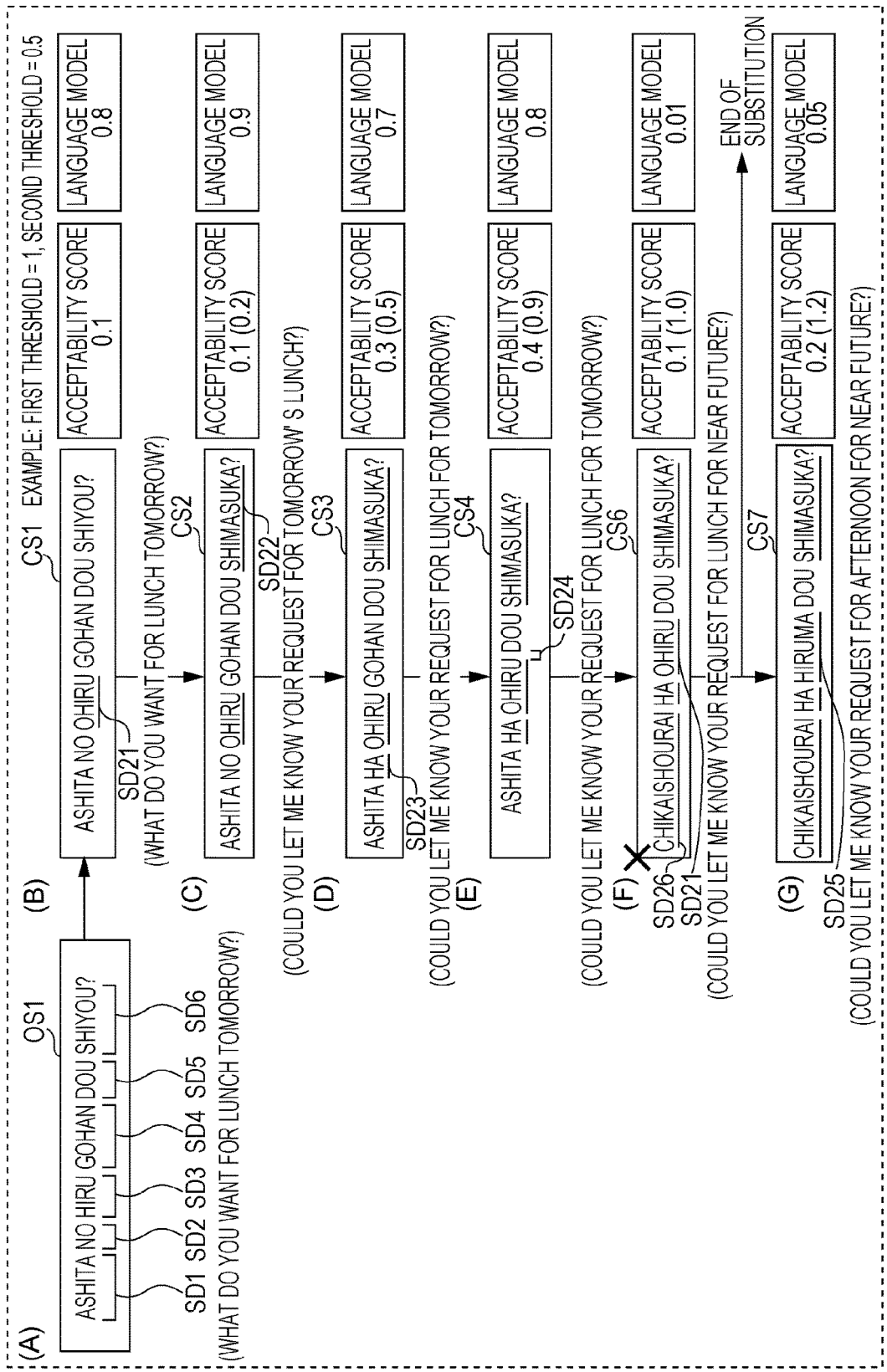
FIG. 10 is an illustration for explaining generation of paraphrases (second paraphrase-generating operation) in a paraphrase generator including the paraphrase generation unit according to the modification.

FIG. 8 is a flowchart illustrating operation of the linguistic acceptability score processing unit in the paraphrase generation unit according to the modification. FIG. 9 is a flowchart illustrating operation of the determination unit (second within-limit determination) in the paraphrase generation unit according to the modification. FIG. 10 is an illustration for explaining generation of paraphrases (second paraphrase-generating operation) in the paraphrase generator including the paraphrase generation unit according to the modification. FIG. 10(A) illustrates a specific example of an original text, and FIG. 10(B) through FIG. 10(F) respectively illustrate paraphrase candidates generated by the first through fifth rounds of paraphrasing applied to the original text illustrated in FIG. 10(A). FIG. 10(G) illustrates a paraphrase candidate generated if the sixth round of paraphrasing is applied to the original text illustrated in FIG. 10(A).

The paraphrase generation unit 2 according to the modification executes the receiving and paraphrasing of an original text described above with reference to FIG. 4. Subsequently, the paraphrase generation unit 2 executes the paraphrase acceptability score processing described above with reference to FIG. 5. Then, the paraphrase generation unit 2 executes, instead of the determination of whether paraphrasing is within an acceptable limit as described above with reference to FIG. 6, linguistic acceptability score processing as illustrated in FIG. 8 and a determination of whether paraphrasing is within an acceptable limit as illustrated in FIG. 9.

Linguistic Acceptability Score Processing

The linguistic acceptability score processing illustrated in FIG. 8 represents processing of linguistic acceptability score in order to evaluate whether a paraphrase candidate generated by the paraphrasing unit 22 has a linguistically correct meaning. Referring to FIG. 8, the linguistic acceptability score processing is executed as follows by the paraphrase generation unit 2 according to the modification. That is, paraphrasing executed by the paraphrasing unit 22 is evaluated by the linguistic acceptability score processing unit 26 based on linguistic information stored in the linguistic information storage unit 25 (S41). The result of this evaluation is acquired as a linguistic acceptability score and output to the determination unit 24 (S42), and this linguistic acceptability score processing is ended. More specifically, the linguistic acceptability score processing unit 26 obtains an N-gram language model of a paraphrase candidate generated by the paraphrasing unit 22 based on a language model stored in the linguistic information storage unit 25, acquires the obtained N-gram language model of the paraphrase candidate as a linguistic acceptability score, and outputs the acquired linguistic acceptability score to the determination unit 24.

Through the above operation, the paraphrase generation unit 2 according to the modification determines a linguistic acceptability score in order to linguistically evaluate a paraphrase candidate.

Determination of whether Paraphrasing is within Acceptable Limit

The determination of whether paraphrasing is within an acceptable limit illustrated in FIG. 9 represents a determination of whether paraphrasing executed by the paraphrasing unit 22 is within an acceptable limit. Referring to FIG. 9, the determination of whether paraphrasing is within an acceptable limit is executed as follows by the paraphrase generation unit 2 according to the modification. First, the determination unit 24 acquires a cumulative paraphrase acceptability score from the paraphrase acceptability score processing unit 23, and acquires a linguistic acceptability score from the linguistic acceptability score processing unit 26 (S51).

Next, the determination unit 24 of the paraphrase generation unit 2 according to the modification determines whether paraphrasing executed by the paraphrasing unit 22 is within the acceptable limit (S52 and S53).

More specifically, the determination unit 24 first determines whether the cumulative paraphrase acceptability score acquired from the paraphrase acceptability score processing unit 23 is equal to or less than the first threshold (S52). If it is determined as a result of this determination that the cumulative paraphrase acceptability score is equal to or less than the first threshold, the determination unit 24 determines that paraphrasing executed by the paraphrasing unit 22 is within the acceptable limit (Yes), and executes the next step S53. If it is determined as a result of the above determination that the cumulative paraphrase acceptability score exceeds the first predetermined threshold, the determination unit 24 determines that the paraphrasing executed by the paraphrasing unit 22 is not within the acceptable limit (No). Thus, the paraphrase candidate generated by the current round of paraphrasing executed by the paraphrasing unit 22 is not retained as a paraphrase, and the paraphrasing unit 22 is instructed to stop the subsequent executions of paraphrasing for a single original text. This ends the determination of whether paraphrasing is within an acceptable limit.

At step S53, the determination unit 24 determines whether the linguistic acceptability score acquired from the linguistic acceptability score processing unit 26 is equal to or greater than the second threshold. If it is determined as a result of this determination that the linguistic acceptability score is equal to or greater than the second threshold, the determination unit 24 determines that the paraphrasing executed by the paraphrasing unit 22 is within the acceptable limit (Yes). Thus, the paraphrase candidate generated by the current round of paraphrasing executed by the paraphrasing unit 22 is stored into the RAM or other memories (not illustrated) as a paraphrase, and the paraphrasing unit 22 is instructed to execute the next round of paraphrasing for a single original text (S54). This ends the determination of whether paraphrasing is within an acceptable limit. If it is determined as a result of the above determination that the linguistic acceptability score is below the second threshold, the determination unit 24 determines that the paraphrasing executed by the paraphrasing unit 22 is not within the acceptable limit (No). Thus, the paraphrase candidate generated by the current round of paraphrasing executed by the paraphrasing unit 22 is not retained as as a paraphrase, and the paraphrasing unit 22 is instructed to stop the subsequent executions of paraphrasing for a single original text. This ends the determination of whether paraphrasing is within an acceptable limit.

Through the above operation, the paraphrase generation unit 2 according to the modification executes a determination of whether paraphrasing is within an acceptable limit in order to evaluate paraphrasing executed by the paraphrasing unit 22.

When execution of paraphrasing by the paraphrasing unit 22 is stopped, the paraphrase generator M outputs the retained paraphrase from the output unit 3.

One specific example of the above operation will be described with reference to FIG. 10. In this specific example, the paraphrase table CT illustrated in FIG. 3 is applied to an original text (input text) OS1 illustrated in FIG. 10(A), and individual fragments are selected in the following order of the corresponding records in the paraphrase table CT illustrated in FIG. 3: the first record, the second record, the third record, the fourth record, the sixth record, and then the fifth record. Accordingly, the original text OS1 illustrated in FIG. 10(A) is the original text OS1 illustrated in FIG. 7(A), and the paraphrase candidates CS1 to CS4 illustrated in FIG. 10(B) through FIG. 10(E) are respectively the paraphrase candidates CS1 to CS4 illustrated in FIG. 7(B) through FIG. 7(E). The first threshold is set to 1, and the second threshold is set to 0.5. Further, the value N of the N-gram language model is set to 3.

First, the original text OS1 illustrated in FIG. 10(A) is input from the input unit 1. Then, through the same process as described above with reference to FIG. 7(B), the paraphrase candidate CS1 illustrated in FIG. 10(B) is generated, and a cumulative paraphrase acceptability score (that is, a paraphrase acceptability score in the first round of paraphrasing) "0.1" is obtained. Then, at step S41, a 3-gram language model "0.8" including the second fragment SD21 paraphrased by the paraphrasing unit 22 is obtained for the paraphrase candidate CS1 illustrated in FIG. 10(B). At step S42, the obtained 3-gram language model "0.8" is acquired as a linguistic acceptability score.

Next, at step S51, the cumulative paraphrase acceptability score "0.1" determined at step S22 and the linguistic acceptability score "0.8" calculated at step S42 are acquired. Then, at step S52, it is first determined whether the acquired cumulative paraphrase acceptability score "0.1" is equal to or less than the first threshold of 1. In the initial round of paraphrasing, the cumulative paraphrase acceptability score "0.1" is equal to or less than the first threshold of 1 as illustrated in FIG. 10(B). Thus, step S53 is executed. At step S53, it is determined whether the acquired linguistic acceptability score "0.8" is equal to or greater than the second threshold of 0.5. In the initial round of paraphrasing, the linguistic acceptability score "0.8" is equal to or less than the second threshold of 0.5 as illustrated in FIG. 10(B). Thus, step S54 is executed. At step S54, the paraphrase candidate CS1 illustrated in FIG. 10(B) is retained as a paraphrase, and the paraphrasing unit 22 is instructed to execute the next (second) round of paraphrasing.

Thus, the second round of paraphrasing is executed in the same manner as described above. As a result, the fragment SD6 in the original text OS1 is paraphrased into the second fragment SD22, the paraphrase candidate CS2 is generated, and a paraphrase acceptability score "0.1", a cumulative paraphrase acceptability score "0.2", and a linguistic acceptability score "0.9" are obtained. The results are illustrated in FIG. 10(C). As illustrated in FIG. 10(C), since the cumulative paraphrase acceptability score "0.2" is equal to or less than the first threshold of 1, step S53 is executed, and since the linguistic acceptability score "0.9" is equal to or greater than the second threshold of 0.5, step S54 is executed. At step S54, the paraphrase candidate CS2 illustrated in FIG. 10(C) is retained as a paraphrase, and the paraphrasing unit 22 is instructed to execute the next (third) round of paraphrasing.

Thus, the third round of paraphrasing is executed in the same manner as described above. As a result, the fragment SD2 in the original text OS1 is paraphrased into the second fragment SD23, the paraphrase candidate CS3 is generated, and a paraphrase acceptability score "0.3", a cumulative paraphrase acceptability score "0.5", and a linguistic acceptability score "0.7" are obtained. As illustrated in FIG. 10(D), since the cumulative paraphrase acceptability score "0.5" is equal to or less than the first threshold of 1, step S53 is executed, and since the linguistic acceptability score "0.7" is equal to or greater than the second threshold of 0.5, step S54 is executed. At step S54, the paraphrase candidate CS3 illustrated in FIG. 10(D) is retained as a paraphrase, and the paraphrasing unit 22 is instructed to execute the next (fourth) round of paraphrasing.

Thus, the fourth round of paraphrasing is executed in the same manner as described above. As a result, the fragment SD4 in the original text OS1 is paraphrased into the second fragment SD24, the paraphrase candidate CS4 is generated, and a paraphrase acceptability score "0.4", a cumulative paraphrase acceptability score "0.9", and a linguistic acceptability score "0.8" are obtained. The results are illustrated in FIG. 10(E). As illustrated in FIG. 10(E), since the cumulative paraphrase acceptability score "0.9" is equal to or less than the first threshold of 1, step S53 is executed, and since the linguistic acceptability score "0.8" is equal to or greater than the second threshold of 0.5, step S54 is executed. At step S54, the paraphrase candidate CS4 illustrated in FIG. 10(E) is retained as a paraphrase, and the paraphrasing unit 22 is instructed to execute the next (fifth) round of paraphrasing.

Thus, the fifth round of paraphrasing is executed in the same manner as described above. As a result, the fragment SD1 in the original text OS1 is paraphrased with a second fragment SD26, a paraphrase candidate CS6 is generated, and a paraphrase acceptability score "0.1", a cumulative paraphrase acceptability score "1.0", and a linguistic acceptability score "0.01" are obtained. As illustrated in FIG. 10(F), in this case, the cumulative paraphrase acceptability score "1.0" is equal to or less than the predetermined threshold of 1. Thus, step S53 is executed. Further, since the linguistic acceptability score "0.01" is not equal to or greater than the second threshold 0.5 (is below the second threshold 0.5), step S54 is not executed. Thus, the paraphrase candidate CS6 illustrated in FIG. 10(F) is not retained as a paraphrase, and the paraphrasing unit 22 is instructed to stop the next (sixth) round of paraphrasing.

Through the above operation, four paraphrase candidates CS1 to CS4 are generated as paraphrases of a single original text OS1, and output from the output unit 3.

Now, suppose that, in the example illustrated in FIG. 10, the determination of whether paraphrasing executed by the paraphrasing unit 22 is within an acceptable limit is made based on the paraphrase acceptability score alone as in FIG.

7. In this case, in the fifth round of paraphrasing, the cumulative paraphrase acceptability score "1.0" is equal to or less than the first threshold of 1. Thus, the paraphrasing unit 22 is instructed to execute the next (sixth) round of paraphrasing. In this case, the fragment SD3 in the original text OS1 (the second fragment SD21 in the paraphrase candidate CS6 that corresponds to the fragment SD3) is paraphrased into the second fragment SD25, a paraphrase candidate CS7 is generated, and a paraphrase acceptability score "0.2", a cumulative paraphrase acceptability score "1.2", and a linguistic acceptability score "0.05" are obtained. The results are illustrated in FIG. 10(G). As illustrated in FIG. 10(G), the cumulative paraphrase acceptability score "1.2" is not equal to or less than the first threshold of 1 (exceeds the first threshold of 1). Thus, step S53 is not executed at the timing of the sixth round of paraphrasing. That is, the paraphrase candidate CS7 illustrated in FIG. 10(F) is not retained as a paraphrase, and the paraphrasing unit 22 is instructed to stop the next (seventh) round of paraphrasing. Therefore, in this case, five paraphrase candidates CS1 to CS4 and CS6 are generated as paraphrases of a single original text OS1, and output from the output unit 3. If the determination of whether paraphrasing executed by the paraphrasing unit 22 is within an acceptable limit is made based on the paraphrase acceptability score alone as described above, there is a possibility that the paraphrase candidate CS6, which no longer has a linguistically correct meaning as a result of paraphrasing, is retained as a paraphrase.

The paraphrase generator M including the paraphrase generation unit 2 according to the modification, and the paraphrase generation method and the non-transitory recording medium having a computer program stored thereon that are respectively implemented and included in the paraphrase generator M make it possible to reduce the possibility that a paraphrase candidate that no longer has a linguistically correct meaning as a result of paraphrasing is retained as a paraphrase, thus allowing more linguistically appropriate paraphrases to be obtained.

In the first embodiment, the paraphrase generator M may be further configured to create a translation corpus. As indicated by dashed lines in FIG. 1, the paraphrase generator M according to such a modification further includes, for example, a translation corpus creator C including a translation corpus creation unit 4 and a translation corpus storage unit 5.

The translation corpus storage unit 5 stores a translation corpus. The translation corpus is a collection of a plurality of text pairs each having a first text in a first language paired with a second text in a second language different from the first language.

The translation corpus creation unit 4 is connected to each of the input unit 1, the paraphrase generation unit 2, and the translation corpus storage unit 5. The translation corpus creation unit 4 creates a translation corpus, and stores the created translation corpus into the translation corpus storage unit 5.

In the paraphrase generator M according to this modification, the input unit 1 receives an original text and a second text, with the original text serving as a first text in the translation corpus. The input unit 1 outputs the received original text to the paraphrase generation unit 2, and outputs the received second text to the translation corpus creation unit 4.

The paraphrase generation unit 2 generates, through the above-mentioned processes, one or more paraphrases of the original text received by the input unit 1, and outputs the generated one or more paraphrases to each of the output unit 3 and the translation corpus creation unit 4.

Then, the translation corpus creation unit 4 creates a translation corpus based on the one or more paraphrases generated by the paraphrase generation unit 2, and the second text received by the input unit 1, and stores the generated translation corpus into the translation corpus storage unit 5. More specifically, the translation corpus creation unit 4 creates one or more new text pairs by pairing the one or more paraphrases of the original text generated by the paraphrase generation unit 2 with the second text received by the input unit 1. The created one or more new text pairs form a new part of the translation corpus stored in the translation corpus storage unit 5. For example, an original text OS11 as a first text, and a second text OS12 are input as a text pair. Alternatively, a translation corpus including the original text OS11 as a first text, and a text OS21 as a second text is input. When two paraphrases CS21 and CS22 are generated from the single original text OS11, a new text pair of the paraphrase CS21 and the second text OS12, and a new text pair including the paraphrase CS22 and the second text OS12 are created. The two new text pairs form a new part of the translation corpus stored in the translation corpus storage unit 5.

A text pair including an original text, which serves as a first text, and a second text, which is received by the input unit 1, may be either a text pair included in the translation corpus stored in the translation corpus storage unit 5, or a text pair not included in the translation corpus stored in the translation corpus storage unit 5. If an original text serving as a first text and a second text that are received as a text pair by the input unit 1 are paired texts not included in the translation corpus stored in the translation corpus storage unit 5, the input unit 1 outputs the received text pair including the original text serving as a first text and a second text to the translation corpus creation unit 4. The translation corpus creation unit 4 may retain this text pair including the original text as a first text and a second text as a new text pair forming a new part of the translation corpus stored in the translation corpus storage unit 5.

The paraphrase generator M according to this modification, and the paraphrase generation method and the non-transitory recording medium having a computer program stored thereon that are respectively implemented and included in the paraphrase generator M allow the number of example texts (text pairs) in a translation corpus to be increased automatically, thus allowing for creation of a translation corpus with a greater number of example texts (text pairs).

In the first embodiment, the paraphrasing unit 22 executes paraphrasing of a first fragment into a second fragment at all times. Alternatively, the paraphrasing unit 22 may not execute paraphrasing of a first fragment into a second fragment depending on a predetermined condition. Such a condition for not executing paraphrasing (Exclude condition) is, for example, registered in a paraphrase table CTa as illustrated in FIG. 11A. FIGS. 11A, 11B, and 11O are illustrations for explaining a paraphrase table according to this modification that is stored in the paraphrase information storage unit of the paraphrase generation unit. FIG. 11A illustrates the paraphrase table CTa according to the modification, FIG. 11B illustrates an original text OS2 and a paraphrase candidate CS8 when the Exclude condition is not met, and FIG. 11c illustrates an original text OS3 and a paraphrase candidate CS9 when the Exclude condition is met.

As opposed to the paraphrase table CT illustrated in FIG. 3 mentioned above, the paraphrase table CTa according to the modification illustrated in FIG. 11A further includes an Exclude condition field 214 in which an Exclude condition is registered. An Exclude condition refers to the condition for not executing paraphrasing of a first fragment registered in the first fragment field 211 into a second fragment registered in the second fragment field 212. In this modification, when executing paraphrasing, the paraphrasing unit 22 extracts an Exclude condition from the Exclude condition field 214 of the paraphrase table CTa stored in the paraphrase information storage unit 21, and determines whether the text to be paraphrased meets the extracted Exclude condition. If the paraphrasing unit 22 determines as a result that the Exclude condition is not met, the paraphrasing unit 22 executes paraphrasing. If the paraphrasing unit 22 determines as a result that the Exclude condition is met, the paraphrasing unit 22 does not execute paraphrasing. In the example illustrated in FIG. 11A, an Exclude condition RP is registered in the fourth record of the Exclude condition field 214. The Exclude condition RP specifies a condition whereby a paraphrase candidate CS generated by paraphrasing does not stand by itself as a sentence or phrase. In one example, such a condition corresponds to when, in the case of Japanese, the first fragment is a noun, and the fragment following the first fragment is a case particle "no". For example, a first fragment SD14 included in the original text OS2 illustrated in FIG. 11B does not meet the Exclude condition RP. Thus, when the first fragment SD14 is paraphrased with a second fragment SD24, a paraphrase candidate CS8 generated as a result stands by itself as a sentence or phrase. However, the first fragment SD14 included in the original text OS3 illustrated in FIG. 11C meets the Exclude condition RP. Thus, if the first fragment SD14 is paraphrased with the second fragment SD24 in this case, a paraphrase candidate CS9 generated as a result does not stand by itself as a sentence or phrase. Use of such an Exclude condition allows the number of inappropriate paraphrase candidates to be reduced.

Next, another embodiment will be described.

Second Embodiment: Machine Translation System

Figure 12:
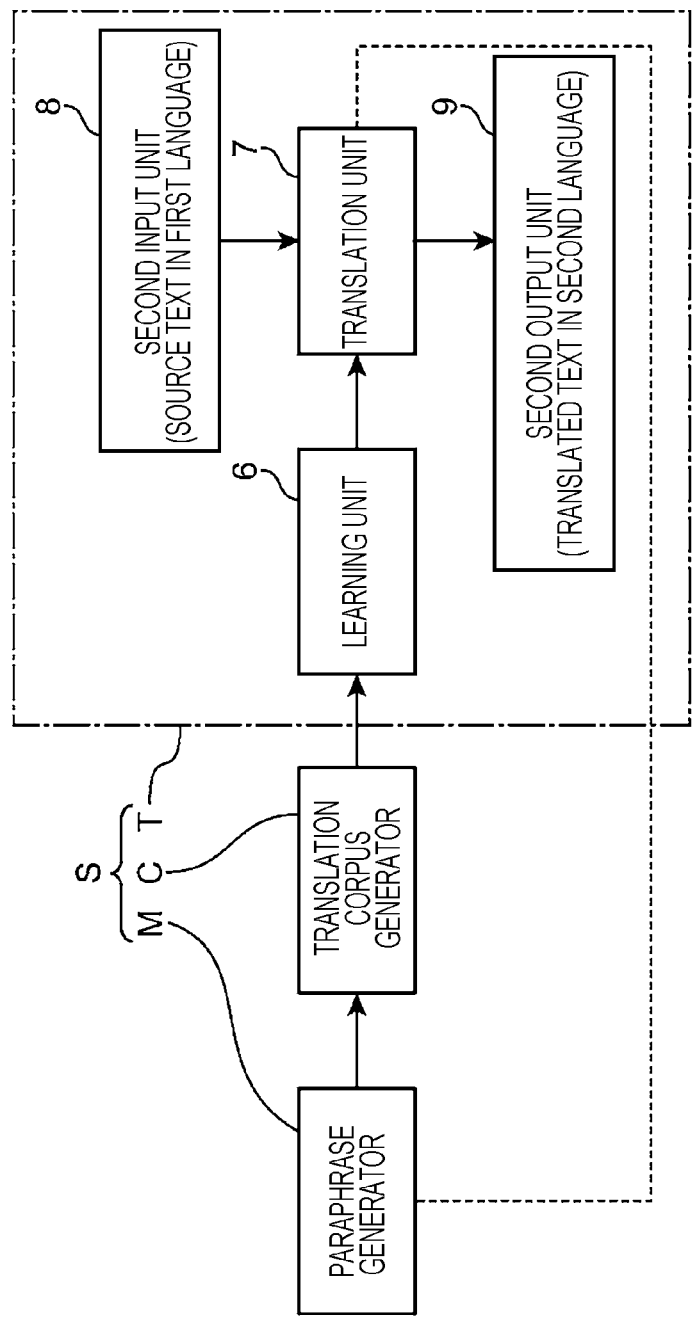
FIG. 12 is a block diagram illustrating the configuration of a machine translation system according to a second embodiment.

FIG. 12 is a block diagram illustrating the configuration of a machine translation system according to a second embodiment. The foregoing description of the first embodiment is directed to the paraphrase generator M, and the paraphrase generation method and the non-transitory recording medium having a computer program stored thereon that are respectively implemented and included in the paraphrase generator M, including their modifications. The following description of the second embodiment is directed to a machine translation system including the paraphrase generator M, that is, a machine translation system that implements the paraphrase generation method and includes the non-transitory recording medium having a computer program stored thereon.

As illustrated in FIG. 12, a machine translation system S according to the second embodiment includes, for example, the paraphrase generator M, the translation corpus creator C, and a translator T. Since the paraphrase generator M and the translation corpus creator C are the same as the apparatus mentioned above as the paraphrase generator M according to the modification that includes the translation corpus creator C including the translation corpus creation unit 4 and the translation corpus storage unit 5, a description of the paraphrase generator M and the translation corpus creator C is not repeated.

The translator T translates a source text, which is a text to be translated, between a first language and a second language based on a translation corpus created by the paraphrase generator M according to the modification that includes the translation corpus creator C. The translator T includes, for example, a learning unit 6, a translation unit 7, a second input unit 8, and a second output unit 9.

The second input unit 8 is connected to the translation unit 7. For example, the second input unit 8 is a device used to input, into the translator T, information including various commands, such as a command that instructs translation to be started, and various data necessary for translating, for example, a source text in a first language. For example, the second input unit 8 is an input device such as a keyboard or a mouse. Alternatively, the second input unit 8 may be, for example, an interface unit. The second output unit 9 is connected to the translation unit 7. The second output unit 9 is a device that outputs information, such as commands or data input from the second input unit 8, and a translated text in a second language translated by the translation unit 7. For example, the second input unit 8 is a display device such as a CRT display, a liquid crystal display (LCD), or an organic EL display, or a printing device such as a printer. The second input unit 8 and the second output unit 9 may form a touch panel. The second input unit 8 may double as the input unit (first input unit) 1, and the second output unit 9 may double as the output unit (first output unit) 3.

The learning unit 6 is connected to the translation unit 7. The learning unit 6 generates or learns a translation model for the translation unit 7 by use of a translation corpus created by the paraphrase generator M according to the modification including the translation corpus creator C.

The translation unit 7 translates a source text in a first language received by the second input unit 8 into a text in a second language to generate a translated text in the second language, and outputs the generated translated text to the second output unit 9.

The translator T including the units 6 to 9 mentioned above is implemented by, for example, an information processor such as a desktop, notebook, or tablet computer.

In the machine translation system S configured as mentioned above, the paraphrase generator M according to the modification including the translation corpus creator C creates a translation corpus (new translation corpus) including new text pairs generated through the operations described above with reference to the first embodiment. Then, the learning unit 6 acquires the created new translation corpus, and uses the acquired new translation corpus to create or learn a translation model for the translation unit 7. As described above with reference to the first embodiment, the new translation corpus contains more example texts, thus allowing a translation model for the translation unit 7 to be generated and learned with improved accuracy. When a source text is received from the second input unit 8, and the translation unit 7 is instructed to perform translation, the translation unit 7 translates the source text, and outputs the translated text to the second output unit 9. Since the translation model for the translation unit 7 is generated or learned with improved accuracy as described above, the translation unit 7 is able to translate the learning unit 6 with improved accuracy.

The machine translation system S configured as described above includes the paraphrase generator M that implements the paraphrase generation method and includes the non-transitory recording medium having a computer program stored thereon. This allows the machine translation system S to create one or more paraphrases from a single original text. Further, the machine translation system S includes the translation corpus creator C. Thus, with the original text as a first text, the machine translation system S is able to create one or more new text pairs by pairing one or more paraphrases of the original text with a second text, and create a new translation corpus with the new text pairs contained as a new part of the translation corpus. Therefore, the machine translation system S allows the number of example texts (text pairs) in the translation corpus to be increased automatically. This enables creation of a translation corpus with more example texts (text pairs), thus allowing for more accurate translation.

In the second embodiment, the paraphrase acceptability score may be varied by a feedback process that takes the translated text output to the second output unit 9 into consideration. FIGS. 13A, 13B, and 13C are illustrations for explaining a modification of the machine translation system. FIG. 13A illustrates a paraphrase table CTb for which no changes have been made to the paraphrase acceptability score. FIG. 13B illustrates a paraphrase table CTc with changed paraphrase acceptability scores. FIG. 13C illustrates paraphrased and translated texts when changes are made to the paraphrase acceptability score.

For example, as illustrated in FIG. 13C, a source text OS4 is input from the second input unit 8 into the machine translation system S by the user, and translated by the translation unit 7. As a result, a translated text TS1 is output to the second output unit 9. The user judges that the translated text TS1 is not a correct translation of the source text OS4. Information indicating that the translated text TS1 is not a correct translation is input by the user with the second input unit 8. Then, with a fragment SD7 in the source text OS4 being a first fragment SD17, a paraphrase CS8 obtained by substituting the fragment SD7 with a second fragment SD27 is input by the user with the second input unit 8. The paraphrase CS8 is translated by the translation unit 7, and a translated text TS2 is output to the second output unit 9. The user judges that the translated text TS2 is a correct translation of the source text OS4. Information indicating that the translated text TS2 is a correct translation is input by the user with the second input unit 8. When the second input unit 8 receives the above-mentioned pieces of data, that is, the indication that the translated text TS1 of the source text OS4 is not a correct translation, the first fragment SD17 that is a substitution source (paraphrase source), the second fragment SD27 that is a substitution target (paraphrase target), and the indication that the translated text TS2 of the source text OS4 is a correct translation, the translation unit 7 outputs these pieces of data to the paraphrase generator M, and instructs the paraphrase generator M to change the corresponding paraphrase acceptability scores according to these pieces of data. To this end, the paraphrase generator M further includes a paraphrase acceptability score changing unit 27 indicated by dashed lines in FIG. 2. The paraphrase acceptability score changing unit 27 changes the corresponding paraphrase acceptability scores based on the above-mentioned pieces of data, that is, the indication that the translated text TS1 of the source text OS4 is not a correct translation, the first fragment SD17 that is a paraphrase source, the second fragment SD27 that is a paraphrase target, and the indication that the translated text TS2 of the source text OS4 is a correct translation. When the paraphrase generator M receives these pieces of data and the instruction mentioned above, the paraphrase acceptability score changing unit 27 searches the paraphrase table CTb, which is stored in the paraphrase information storage unit 21, for a first record in which the first fragment SD17 (=SD7) and the second fragment SD27 are registered respectively as a paraphrase source and a paraphrase target in the first fragment field 211 and the second fragment field 212, and for a second record in which the second fragment SD27 and the first fragment SD17 (=SD7) are registered respectively as a paraphrase target (=SD18) and a paraphrase source (=SD28) in the first fragment field 211 and the second fragment field 212. If the first record is retrieved as a result of this search, the paraphrase acceptability score changing unit 27 of the paraphrase generator M decreases the paraphrase acceptability score registered in the paraphrase acceptability score field 213 of the first record by a predetermined value (first predetermined value). If the second record is retrieved as a result of the above search, the paraphrase acceptability score changing unit 27 of the paraphrase generator M increases the paraphrase acceptability score registered in the paraphrase acceptability score field 213 of the second record by a predetermined value (second predetermined value). In the example illustrated in FIGS. 13A and 13B, the paraphrase table CTb illustrated in FIG. 13A is changed to the paraphrase table CTc illustrated in FIG. 13B. Then, the paraphrase table CTc with the changed paraphrase acceptability scores is stored into the paraphrase information storage unit 21 of the paraphrase generator M. Alternatively, instead of increasing the paraphrase acceptability score by the second predetermined value, the corresponding paraphrase pair may be deleted.

As a result, the paraphrase acceptability score for the paraphrasing that has led to a correct translation (first fragment→second fragment) is lowered so that this paraphrasing is accepted to a greater degree, whereas the paraphrase acceptability score for the paraphrasing that has not led to a correct translation (second fragment→first fragment) (that is, the paraphrase acceptability score for the paraphrasing applied in a direction opposite (second fragment→first fragment) to the paraphrasing that has led to a correct translation (first fragment→second fragment)) is increased so that this paraphrasing is accepted to a lesser degree. This enables the paraphrase generator M to create example texts (paraphrases) for a translation corpus that allow for more accurate translation.

Among the various aspects of the techniques disclosed herein, major aspects are summarized as follows.

In one aspect, the techniques feature a paraphrase generation method including receiving, with a processor, an original text, generating, with the processor, one or more paraphrases of the original text by paraphrasing, within an acceptable limit for accepting paraphrasing, one or more of a plurality of fragments included in the original text into another expression in the language of the original text, the plurality of fragments being obtained by dividing the original text in accordance with a predetermined rule. In another preferred aspect, in the paraphrase generation method mentioned above, the generating of the one or more paraphrases includes paraphrasing one of the one or more fragments included in the original text into another expression in the language of the original text to generate a paraphrase candidate for the original text, and determining whether the paraphrasing is within the acceptable limit, the paraphrasing is executed until the determining determines that the paraphrasing is not within the acceptable limit, and the determining includes determining, as the one or more paraphrases, the paraphrase candidate generated by the paraphrasing that is determined to be within the acceptable limit.

The paraphrase generation method mentioned above paraphrases, within an acceptable limit for accepting paraphrasing, one or more of a plurality of fragments included in an original text into another expression in the language of the original text to thereby generate one or more paraphrases of the original text. Therefore, the paraphrase generation method allows one or more paraphrases to be created as example texts from a single original text.

In another aspect, in the paraphrase generation method mentioned above, the determining includes determining whether the paraphrasing is within the acceptable limit based on a paraphrase acceptability score, the paraphrase acceptability score being assigned to a paraphrase pair including a first fragment and a second fragment that represents another expression of the first fragment, the paraphrase acceptability score indicating a degree to which paraphrasing from the first fragment into the second fragment is accepted.

With the paraphrase generation method mentioned above, a paraphrase acceptability score, which indicates the degree to which paraphrasing from the first fragment to the second fragment is accepted, is assigned in advance to each paraphrase pair including the first and second fragments. Therefore, the paraphrase generation method mentioned above allows for a quantitative comparison and assessment of paraphrase acceptability score and acceptable limit. Further, suppose that the paraphrase acceptability score is set to smaller values for more acceptable paraphrases. In this case, for example, the paraphrase generation method assigns relatively small values in advance for the acceptability scores of certain types of paraphrase pairs, such as paraphrase pairs generally paraphrased with relatively high frequencies and paraphrase pairs of synonyms, thus allowing for generation of paraphrases that are substantially identical in meaning to the original text through quantitative comparison and assessment of paraphrase acceptability score and acceptable limit.

In another aspect, in the paraphrase generation method mentioned above, the determining includes determining whether the paraphrasing is within the acceptable limit further based on a linguistic acceptability score, the linguistic acceptability score indicating a degree to which the paraphrase candidate generated by the paraphrasing is accepted as having a linguistically correct meaning. In a preferred implementation, in the paraphrase generation method mentioned above, the linguistic acceptability score represents a language model of the paraphrase candidate. In another preferred implementation, in the paraphrase generation method mentioned above, the linguistic acceptability score represents a semantic vector of the paraphrase candidate.

The paraphrase generation method mentioned above includes determining whether paraphrasing is within the acceptable limit further based on a linguistic acceptability score, which is a measure of the degree to which a paraphrase candidate is accepted as having a linguistically correct meaning. Therefore, the paraphrase generation method makes it possible to reduce the possibility that a paraphrase candidate that no longer has a linguistically correct meaning as a result of paraphrasing is retained as a paraphrase, thus allowing more linguistically appropriate paraphrases to be obtained.

In another aspect, the paraphrase generation method mentioned above further includes creating a translation corpus that includes a collection of a plurality of text pairs, the plurality of text pairs each including a first text in a first language paired with a second text in a second language. The receiving includes further receiving the second text, with the original text being the first text. The creating of the translation corpus includes creating one or more new text pairs, the one or more new text pairs each including the received second text and the one or more paraphrases of the original text that are generated by the generating of the one or more paraphrases. The one or more new text pairs thus created form a new part of the translation corpus.

The paraphrase generation method mentioned above further includes creating a translation corpus. The creating of a translation corpus includes creating one or more new text pairs that each include, with the original text being the first text, the one or more paraphrases of the original text and the second text. The created one or more new text pairs thus created form a new part of the translation corpus. Thus, the paraphrase generation method mentioned above allows the number of example texts (text pairs) in the translation corpus to be increased automatically. This enables creation of a translation corpus with more example texts (text pairs).

In another aspect, the techniques feature an apparatus including a processor, and a medium having a computer program stored thereon. The computer program causes the processor to execute operations including receiving an original text, and generating one or more paraphrases of the original text by paraphrasing, within an acceptable limit for accepting paraphrasing, one or more of a plurality of fragments included in the original text into another expression in the language of the original text, the plurality of fragments being obtained by dividing the original text in accordance with a predetermined rule.

In another aspect, the techniques feature a non-transitory recording medium having a computer program stored thereon, the computer program causing a processor to execute operations including receiving an original text, and generating one or more paraphrases of the original text by paraphrasing, within an acceptable limit for accepting paraphrasing, one or more of a plurality of fragments included in the original text into another expression in the language of the original text, the plurality of fragments being obtained by dividing the original text in accordance with a predetermined rule.

The paraphrase generation method and the non-transitory recording medium having a computer program stored thereon mentioned above paraphrases, within an acceptable limit for accepting paraphrasing, one or more of a plurality of fragments included in an original text into another expression in the language of the original text to thereby generate one or more paraphrases of the original text. Therefore, the paraphrase generator and the non-transitory recording medium having a computer program stored thereon allow one or more paraphrases to be created as example texts from a single original text.

In another aspect, the techniques feature a machine translation system including a paraphrase generator that receives an original text, and generates one or more paraphrases of the original text, a translation corpus creator that creates a translation corpus including a collection of a plurality of text pairs, the plurality of text pairs each including a first text in a first language paired with a second text in a second language different from the first language, and a translator that translates a source text between the first language and the second language based on the translation corpus created by the translation corpus creator, the source text representing a text to be translated. The translation corpus creator creates one or more new text pairs, the one or more new text pairs each including the second text and the one or more paraphrases of the original text that are generated by the paraphrases generator with the original text being the first text. The one or more new text pairs thus created form a new part of the translation corpus. The paraphrase generator implements any one of the paraphrase generation methods mentioned above.

The machine translation system configured as described above includes the paraphrase generator that implements any one of the paraphrase generation methods mentioned above. This allows the machine translation system to create one or more paraphrases from a single original text. Further, the machine translation system includes the translation corpus creator. Thus, with the original text being the first text, the machine translation system is able to create one or more new text pairs by pairing one or more paraphrases of the original text with the second text. The one or more new text pairs thus created form a new part of the translation corpus. Therefore, the machine translation system mentioned above allows the number of example texts (text pairs) in the translation corpus to be increased automatically. This enables creation of a translation corpus with more example texts (text pairs), thus allowing for more accurate translation.

Although the present disclosure has been described above in appropriate and sufficient detail by way of its embodiments with reference to the drawings in order to aid in understanding the present disclosure, it is to be noted that those skilled in the art will readily make adaptations and/or improvements to the above embodiments. Therefore, any adaptations or modifications made by those skilled in the art are to be construed to fall within the scope of the claims as set forth herein, unless such adaptations or modifications depart from the scope of the claims.

The present disclosure makes it possible to provide a paraphrase generation method, a paraphrase generator, and a non-transitory recording medium having a computer program stored thereon that allow one or more paraphrases to be created from a single original text, and a machine translation system that includes or implements the same.

What is claimed is:

1. A paraphrase generation method, comprising:
receiving an original text;
generating, using a processor, one or more paraphrase candidate sentences by paraphrasing one or more of a plurality of fragments included in the original text into another expression in a language of the original text, the plurality of fragments being obtained by dividing the original text in accordance with a predetermined rule;
determining whether the paraphrasing of one or more of the plurality of fragments in each of the one or more paraphrase candidate sentences is acceptable by comparing each of a cumulative total of paraphrase acceptability scores with a first acceptable limit, each of the cumulative total of paraphrase acceptability scores being calculated by adding each of paraphrase acceptability scores in each of the one or more paraphrase candidate sentences, each of the paraphrase acceptability scores being assigned to a paraphrase pair including a first fragment and a second fragment that represents another expression of the first fragment, each of the paraphrase acceptability scores indicating a degree to which paraphrasing from the first fragment into the second fragment is accepted;
determining whether each of the one or more paraphrase candidate sentences is acceptable by comparing each of linguistic acceptability scores with a second acceptable limit, each of the linguistic acceptability scores indicating a degree to which the paraphrase candidate sentence is accepted as having a linguistically correct meaning, and each of the linguistic acceptability scores being obtained from a language model; and
outputting each of the one or more paraphrase candidate sentences when (i) each of the cumulative total of paraphrase acceptability scores is within the first acceptable limit, and (ii) each of the linguistic acceptability scores is within the second acceptable limit.

2. The paraphrase generation method according to claim 1,
wherein the paraphrasing in generating each of the one or more paraphrase candidate sentences is executed until (i) the determining determines that the paraphrasing is not within the first acceptable limit, or (ii) the determining determines that the paraphrase candidate sentence is not within the second acceptable limit.

3. The paraphrase generation method according to claim 1, further comprising:
creating a translation corpus that includes a collection of a plurality of text pairs, the plurality of text pairs each including a first text in a first language paired with a second text in a second language,
wherein the receiving includes further receiving the second text, with the original text being the first text, and
wherein the creating of the translation corpus includes creating one or more new text pairs, the one or more new text pairs each including the received second text and the one or more paraphrase candidate sentences, the created one or more new text pairs forming a new part of the translation corpus.

4. An apparatus, comprising:
a processor; and
a medium having a computer program stored thereon, the computer program causing the processor to execute operations including
receiving an original text;
generating, using the processor, one or more paraphrase candidate sentences by paraphrasing one or more of a plurality of fragments included in the original text into another expression in a language of the original text, the plurality of fragments being obtained by dividing the original text in accordance with a predetermined rule;
determining whether the paraphrasing of one or more of the plurality of fragments in each of the one or more paraphrase candidate sentences is acceptable by comparing each of a cumulative total of paraphrase acceptability scores with a first acceptable limit, each of the cumulative total of paraphrase acceptability scores being calculated by adding each of paraphrase acceptability scores in each of the one or more paraphrase candidate sentences, each of the paraphrase acceptability scores being assigned to a paraphrase pair including a first fragment and a second fragment that represents another expression of the first fragment, each of the paraphrase acceptability scores indicating a degree to which paraphrasing from the first fragment into the second fragment is accepted;
determining whether each of the one or more paraphrase candidate sentences is acceptable by comparing each of linguistic acceptability scores with a second acceptable limit, each of the linguistic acceptability scores indicating a degree to which the paraphrase candidate sentence is accepted as having a linguistically correct meaning, and each of the linguistic acceptability scores being obtained from a language model; and outputting each of the one or more paraphrase candidate sentences when (i) each of the cumulative total of paraphrase acceptability scores is within the first acceptable limit, and (ii) each of the linguistic acceptability scores is within the second acceptable limit.

5. A non-transitory recording medium having a computer program stored thereon, the computer program causing a processor to execute operations comprising:

receiving an original text;

generating, using the processor, one or more paraphrase candidate sentences by paraphrasing one or more of a plurality of fragments included in the original text into another expression in a language of the original text, the plurality of fragments being obtained by dividing the original text in accordance with a predetermined rule;

determining whether the paraphrasing of one or more of the plurality of fragments in each of the one or more paraphrase candidate sentences is acceptable by comparing each of a cumulative total of paraphrase acceptability scores with a first acceptable limit, each of the cumulative total paraphrase acceptability scores being calculated by adding each of paraphrase acceptability scores in each of the one or more paraphrase candidate sentences, each of the paraphrase acceptability scores being assigned to a paraphrase pair including a first fragment and a second fragment that represents another expression of the first fragment, each of the paraphrase acceptability scores indicating a degree to which paraphrasing from the first fragment into the second fragment is accepted;

determining whether each of the one or more paraphrase candidate sentences is acceptable by comparing each of linguistic acceptability scores with a second acceptable limit, each of the linguistic acceptability scores indicating a degree to which the paraphrase candidate sentence is accepted as having a linguistically correct meaning, and each of the linguistic acceptability score being obtained from a language model; and outputting each of the one or more paraphrase candidate sentences when (i) each of the cumulative total of paraphrase acceptability scores is within the first acceptable limit, and (ii) each of the linguistic acceptability scores is within the second acceptable limit.

6. A machine translation system, comprising:

a processor; and a medium having a computer program stored therein, the computer programs causing the processor to execute operations, including receiving an original text;

generating, using the processor, one or more paraphrase candidate sentences by paraphrasing one or more of a plurality of fragments included in the original text into another expression in a language of the original text, the plurality of fragments being obtained by dividing the original text in accordance with a predetermined rule;

determining whether the paraphrasing of one or more of the plurality of fragments in each of the one or more paraphrase candidate sentences is acceptable by comparing each of a cumulative total of paraphrase acceptability scores with a first acceptable limit, each of the cumulative total of paraphrase acceptability scores being calculated by adding each of paraphrase acceptability scores in each of the one or more paraphrase candidate sentences, each of the paraphrase acceptability scores being assigned to a paraphrase pair including a first fragment and a second fragment that represents another expression of the first fragment, each of the paraphrase acceptability scores indicating a degree to which paraphrasing from the first fragment into the second fragment is accepted;

determining whether each of the one or more paraphrase candidate sentences is acceptable by comparing each of linguistic acceptability scores with a second acceptable limit, each of the linguistic acceptability scores indicating a degree to which the paraphrase candidate sentence is accepted as having a linguistically correct meaning and each of the linguistic acceptability scores being obtained from a language model;

outputting each of the one or more paraphrase candidate sentences when (i) each of the cumulative total of paraphrase acceptability scores is within the first acceptable limit, and (ii) each of the linguistic acceptability scores is within the second acceptable limit;

creating a translation corpus including a collection of a plurality of text pairs, the plurality of text pairs each including a first text in a first language paired with a second text in a second language different from the first language; and translating a source text between the first language and the second language using the translation corpus, the source text representing a text to be translated, wherein the creating of the translation corpus creates one or more new text pairs, the one or more new text pairs each including the second text and the one or more paraphrase candidate sentences, the created one or more new text pairs forming a new part of the translation corpus.

7. The paraphrase generation method according to claim 1, further comprising:

presenting the one or more paraphrase candidates to user;

receiving a value of evaluation of the user; and changing one of a value of the first acceptable limit and a value of the second acceptable limit using the value of evaluation.

* * * * *